(12) United States Patent  (10) Patent No.: US 8,704,504 B2
Ito  (45) Date of Patent: Apr. 22, 2014

(54) POWER SUPPLY CIRCUIT COMPRISING DETECTION CIRCUIT INCLUDING REFERENCE VOLTAGE CIRCUITS AS REFERENCE VOLTAGE GENERATION CIRCUITS

(75) Inventor: Yoshiaki Ito, Itabashi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 100 days.

(21) Appl. No.: 13/213,683

(22) Filed: Aug. 19, 2011

(65) Prior Publication Data

US 2012/0057376 A1 Mar. 8, 2012

(30) Foreign Application Priority Data

Sep. 3, 2010 (JP) ................. 2010-197283

(51) Int. Cl.
*H02M 3/156* (2006.01)
(52) U.S. Cl.
USPC ........................................................ 323/284
(58) Field of Classification Search
USPC ......... 323/265, 282, 284, 285, 288, 351, 283, 323/312, 313
See application file for complete search history.

(56) References Cited

U.S. PATENT DOCUMENTS

| | | | |
|---|---|---|---|
| 4,769,753 A | 9/1988 | Knudson et al. | |
| 4,914,375 A | 4/1990 | Hatanaka | |
| 5,726,564 A * | 3/1998 | Takashima | 323/367 |
| 5,727,193 A | 3/1998 | Takeuchi | |
| 5,943,227 A * | 8/1999 | Bryson et al. | 323/283 |
| 6,549,429 B2 | 4/2003 | Konno | |
| 6,724,156 B2 | 4/2004 | Fregoso | |
| 6,798,180 B2 | 9/2004 | Sase et al. | |
| 6,940,482 B2 | 9/2005 | Ishii et al. | |
| 6,969,959 B2 | 11/2005 | Black et al. | |

(Continued)

FOREIGN PATENT DOCUMENTS

| | | |
|---|---|---|
| JP | 06-348220 | 12/1994 |
| JP | 10-127047 | 5/1998 |

(Continued)

OTHER PUBLICATIONS

Fujii, "Analog Electronic Circuit in the integrated circuit era" 7.2.1 Reverse amplifier circuit, p. 161, Feb. 25, 2004.

*Primary Examiner* — Jue Zhang
*Assistant Examiner* — Alex Torres-Rivera
(74) *Attorney, Agent, or Firm* — Eric J. Robinson; Robinson Intellectual Property Law Office, P.C.

(57) ABSTRACT

It is an object to obtain a detection circuit for detecting feedback voltage without variation in output voltage/current or in output voltage by the operation temperature, and a power supply circuit including thereof. A power supply circuit includes a detection circuit, an amplifier circuit outputting an output voltage, a control circuit, and a divider circuit. The detection circuit includes first and second reference voltage generation circuits and an input signal adjustment circuit. The control circuit is electrically connected to the amplifier circuit and includes the detection circuit, an error amplifier circuit, a pulse width modulation driver, a triangle-wave generation circuit, and a capacitor. The divider circuit is electrically connected to the amplifier circuit and the control circuit and inputs a voltage obtained by dividing the output voltage to the second reference voltage generation circuit. Note that the first and second reference voltage generation circuits are each a reference voltage circuit.

20 Claims, 11 Drawing Sheets

(56) References Cited

U.S. PATENT DOCUMENTS

| | | | |
|---|---|---|---|
| 6,969,977 B1 * | 11/2005 | Smith | 323/222 |
| 7,005,762 B2 | 2/2006 | Black | |
| 7,206,343 B2 | 4/2007 | Pearce | |
| 7,285,944 B2 * | 10/2007 | Ishii et al. | 323/288 |
| 7,342,764 B2 | 3/2008 | Black | |
| 7,358,627 B2 | 4/2008 | Black et al. | |
| 7,480,128 B2 | 1/2009 | Black | |
| 7,538,526 B2 * | 5/2009 | Kojima et al. | 323/225 |
| 7,626,371 B2 * | 12/2009 | Hoshino et al. | 323/283 |
| 7,656,946 B2 | 2/2010 | Morishima | |
| 7,719,817 B2 | 5/2010 | Newman | |
| 7,859,815 B2 | 12/2010 | Black et al. | |
| 7,990,122 B2 | 8/2011 | Sase et al. | |
| 8,099,199 B2 | 1/2012 | Takegami et al. | |
| 2002/0060560 A1 | 5/2002 | Umemoto | |
| 2002/0185994 A1 | 12/2002 | Kanouda et al. | |
| 2003/0043090 A1 | 3/2003 | Yazawa et al. | |
| 2003/0160744 A1 | 8/2003 | Yoshida et al. | |
| 2003/0197494 A1 | 10/2003 | Kanouda et al. | |
| 2004/0080501 A1 | 4/2004 | Koyama | |
| 2005/0012698 A1 | 1/2005 | Takahashi | |
| 2005/0110719 A1 | 5/2005 | Satoh et al. | |
| 2005/0116655 A1 | 6/2005 | Yazawa | |
| 2007/0029977 A1 | 2/2007 | Asada | |
| 2007/0182395 A1 | 8/2007 | Sakai et al. | |
| 2007/0262760 A1 * | 11/2007 | Liu | 323/282 |
| 2008/0024012 A1 | 1/2008 | Qahouq et al. | |
| 2009/0001949 A1 * | 1/2009 | Komori | 323/272 |
| 2009/0009505 A1 | 1/2009 | Koyama | |
| 2009/0033310 A1 * | 2/2009 | Erbito, Jr. | 323/313 |
| 2009/0058383 A1 * | 3/2009 | Ryoo | 323/282 |
| 2009/0140710 A1 * | 6/2009 | Matthews | 323/284 |
| 2009/0153124 A1 * | 6/2009 | Ishii | 323/290 |
| 2009/0243575 A1 * | 10/2009 | Akiyama et al. | 323/282 |
| 2009/0322302 A1 * | 12/2009 | Fukushi | 323/284 |
| 2010/0045110 A1 | 2/2010 | Liu et al. | |
| 2011/0074379 A1 * | 3/2011 | Morimoto et al. | 323/304 |
| 2011/0254523 A1 | 10/2011 | Ito et al. | |

FOREIGN PATENT DOCUMENTS

| | | |
|---|---|---|
| JP | 10-283148 | 10/1998 |
| JP | 2003-284325 | 10/2003 |
| JP | 2006-238062 | 9/2006 |
| JP | 2009-100609 | 5/2009 |
| JP | 2009-303313 | 12/2009 |

* cited by examiner

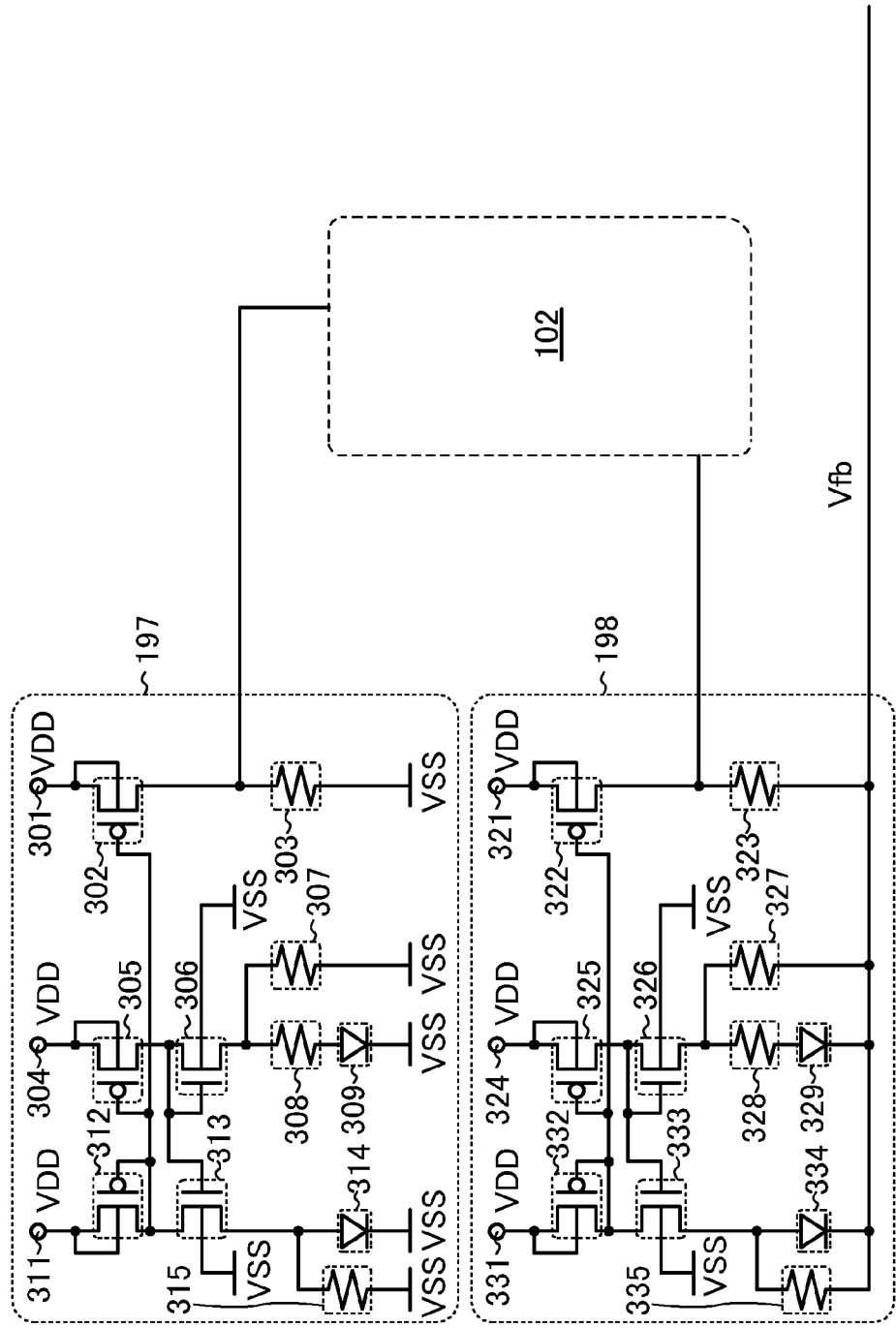

POWER SUPPLY CIRCUIT COMPRISING DETECTION CIRCUIT INCLUDING REFERENCE VOLTAGE CIRCUITS AS REFERENCE VOLTAGE GENERATION CIRCUITS

BACKGROUND OF THE INVENTION

1. Field of the Invention

One embodiment of the invention disclosed herein relates to power supply circuits.

2. Description of the Related Art

In some cases, it is necessary to input negative voltage in a liquid crystal display device, a CCD, a digital camera, or the like. As a circuit for supplying such negative voltage, inverting DCDC converter circuits have been known (see Patent Document 1).

In Patent Document 1, a feedback voltage VFB which is negative voltage is generated using a power source voltage VDD and a ground voltage GND (0 V).

The feedback voltage VFB which is negative voltage is converted into positive voltage by a negative-to-positive voltage conversion circuit. Accordingly, the feedback voltage VFB which is negative voltage is detected by the negative-to-positive voltage conversion circuit.

Reference

[Patent Document 1] Japanese Published Patent Application No. 2009-303313

SUMMARY OF THE INVENTION

In the power supply circuit in Patent Document 1, the negative-to-positive voltage conversion circuit for detecting feedback voltage which is negative voltage includes an n-channel MOS transistor and a p-channel MOS transistor.

The MOS transistor is disadvantageous in that the output current varies by potentials of a gate, a drain, and a back gate with respect to a potential of a source. Therefore, when the negative-to-positive voltage conversion circuit includes an n-channel MOS transistor and a p-channel MOS transistor as in the case of the power supply circuit in Patent Document 1, there is a possibility that the output current of the MOS transistors might vary and thus the output voltage of the negative-to-positive voltage conversion circuit might vary.

Further, the MOS transistor is disadvantageous in that the output current varies by the operation temperature. Therefore, when the negative-to-positive voltage conversion circuit includes an n-channel MOS transistor and a p-channel MOS transistor as in the case of the power supply circuit in Patent Document 1, there is a possibility that the output current of the MOS transistors might vary and thus the output voltage of the negative-to-positive voltage conversion circuit might vary.

In view of the foregoing, an object of one embodiment of the invention disclosed herein is to obtain a detection circuit for detecting a feedback voltage without variation in output voltage/current.

Further, another object of one embodiment of the invention disclosed herein is to obtain a detection circuit for detecting a feedback voltage without variation in output voltage by the operation temperature.

Furthermore, another object of one embodiment of the invention disclosed herein is to obtain a power supply circuit including the above detection circuit.

One embodiment of the of the invention disclosed herein is to provide a detection circuit including a first reference voltage generation circuit for outputting an output voltage Vref being provided between a power source voltage VDD and a power source voltage VSS (e.g., a ground voltage GND (0 V)) which is lower than the power source voltage VDD; and a second reference voltage generation circuit for outputting an output voltage (Vref-Vfb) being provided between the power source voltage VDD and a feedback voltage Vfb.

The output voltage Vref of the first reference voltage generation circuit and the output voltage (Vref-Vfb) of the second reference voltage generation circuit are input to an input signal adjustment circuit. The detection circuit includes the first reference voltage generation circuit, the second reference voltage generation circuit, and the input signal adjustment circuit. The input signal adjustment circuit directly outputs the output voltage Vref from the first reference voltage generation circuit; and the input signal adjustment circuit converts the output voltage (Vref-Vfb) from the second reference voltage generation circuit into a voltage Verr_in and outputs the voltage Verr_in.

The output voltage Vref and the voltage Verr_in which are output from the input signal adjustment circuit are input to an error amplifier circuit. The error amplifier circuit functions so that the levels of input voltages become equal. Thus, the levels of the output voltage Vref and the voltage Verr_in become equal.

That is, one embodiment of the invention disclosed herein is to provide such an input signal adjustment circuit in which the levels of the output voltage Vref and the voltage Verr_in which are input to the error amplifier circuit become equal.

In one embodiment of the invention disclosed herein, in order to make equal the levels of the output voltage Vref and the voltage Verr_in, it is necessary to make equal the output voltage Vref from the first reference voltage generation circuit and the feedback volage Vfb from the divider circuit. Thus, one embodiment of the invention disclosed herein is to provide a first reference voltage generation circuit, a second reference voltage generation circuit, and an input signal adjustment circuit so that the output voltage Vref from the first reference voltage generation circuit and the feedback volage Vfb from the divider circuit become equal.

As described above, in one embodiment of the invention disclosed herein, the detection circuit including the first reference voltage generation circuit, the second reference voltage generation circuit, and the input signal adjustment circuit can detect a feedback voltage Vfb which is negative voltage.

In one embodiment of the invention disclosed herein, the first reference voltage generation circuit and the second reference voltage generation circuit are each a band gap reference including a diode and a resistor. The detection circuit in one embodiment of the invention disclosed herein includes the first reference voltage generation circuit, the second reference voltage generation circuit, and the input signal adjustment circuit. Accordingly, a detection circuit with high output stability, in which output voltage do not vary by output voltage/current, can be obtained.

In one embodiment of the invention disclosed herein, the first reference voltage generation circuit and the second reference voltage generation circuit are each a band gap reference including a diode and a resistor. The detection circuit in one embodiment of the invention disclosed herein includes the first reference voltage generation circuit, the second reference voltage generation circuit, and the input signal adjustment circuit. Accordingly, a detection circuit with high output stability, in which output voltage do not vary by the operation temperature, can be obtained.

The band gap reference is a reference voltage circuit utilizing a band gap. In a band gap reference utilizing a band gap energy of silicon, the output voltage is approximately 1.25 V.

In one embodiment of the invention disclosed herein, a diode including a silicon substrate or a diode including a silicon thin film provided over an insulating substrate is used for the diode. Instead of the diode, a diode-connected transistor can also be used. With the use of the diode or the diode-connected transistor, a detection circuit with high output stability can be obtained.

Further, in one embodiment of the invention disclosed herein, a power supply circuit including the detection circuit for detecting the feedback voltage Vfb which is negative voltage can be obtained.

One embodiment of the invention disclosed herein relates to a power supply circuit including a detection circuit, an amplifier circuit that outputs an output voltage, a control circuit, and a divider circuit. The detection circuit includes a first reference voltage generation circuit, a second reference voltage generation circuit, and an input signal adjustment circuit. The control circuit is electrically connected to the amplifier circuit and includes the detection circuit, an error amplifier circuit, a pulse width modulation driver, a triangle-wave generation circuit, and a capacitor. The divider circuit is electrically connected to the amplifier circuit and the control circuit and inputs a voltage obtained by dividing the output voltage as a feedback voltage to the second reference voltage generation circuit. Note that the first reference voltage generation circuit and the second reference voltage generation circuit are each a reference voltage circuit.

Another embodiment of the invention disclosed herein relates to a power supply circuit including a detection circuit, an amplifier circuit that outputs an output voltage, a control circuit, and a divider circuit. The detection circuit includes a first reference voltage generation circuit, a second reference voltage generation circuit, and an input signal adjustment circuit. The control circuit is electrically connected to the amplifier circuit and includes the detection circuit, an error amplifier circuit, a pulse width modulation driver, a triangle-wave generation circuit, and a capacitor. The divider circuit is electrically connected to the amplifier circuit and the control circuit and inputs a voltage obtained by dividing the output voltage as a feedback voltage to the second reference voltage generation circuit. Note that the first reference voltage generation circuit and the second reference voltage generation circuit are each a reference voltage circuit including a diode and a resistor.

Another embodiment of the invention disclosed herein relates to a power supply circuit including a detection circuit, an amplifier circuit that outputs an output voltage, a control circuit, an input signal adjustment circuit, and a divider circuit. The detection circuit includes a first reference voltage generation circuit, a second reference voltage generation circuit, and the input signal adjustment circuit. The control circuit is electrically connected to the amplifier circuit and includes the detection circuit, an error amplifier circuit, a pulse width modulation driver, a triangle-wave generation circuit, and a capacitor. The input signal adjustment circuit includes an operational amplifier, two resistors each having a first resistance value, and two resistors each having a second resistance value. The divider circuit is electrically connected to the amplifier circuit and the control circuit and inputs a voltage obtained by dividing the output voltage as a feedback voltage to the second reference voltage generation circuit. Note that the first reference voltage generation circuit and the second reference voltage generation circuit are each a reference voltage circuit.

Another embodiment of the invention disclosed herein relates to a power supply circuit including a detection circuit, an amplifier circuit that outputs an output voltage, a control circuit, an input signal adjustment circuit, and a divider circuit. The detection circuit includes a first reference voltage generation circuit, a second reference voltage generation circuit, and the input signal adjustment circuit. The control circuit is electrically connected to the amplifier circuit and includes the detection circuit, an error amplifier circuit, a pulse width modulation driver, a triangle-wave generation circuit, and a capacitor. The input signal adjustment circuit includes an operational amplifier, two resistors each having a first resistance value, and two resistors each having a second resistance value. The divider circuit is electrically connected to the amplifier circuit and the control circuit and inputs a voltage obtained by dividing the output voltage as a feedback voltage to the second reference voltage generation circuit. Note that the first reference voltage generation circuit and the second reference voltage generation circuit are each a reference voltage circuit including a diode and a resistor.

In the embodiment of the invention disclosed herein, the amplifier circuit is a DC-DC converter.

In the embodiment of the invention disclosed herein, the amplifier circuit is a Cuk converter.

In the embodiment of the invention disclosed herein, the amplifier circuit is a fly-back converter.

In the embodiment of the invention disclosed herein, a voltage follower is provided between the divider circuit and the second reference voltage generation circuit.

In the embodiment of the invention disclosed herein, the feedback voltage is negative voltage.

According to one embodiment of the invention disclosed herein, a detection circuit for detecting feedback voltage without variation in output voltage/current can be obtained.

Further, according to one embodiment of the invention disclosed herein, a detection circuit for detecting feedback voltage without variation in output voltage by the operation temperature can be obtained.

Furthermore, according to one embodiment of the invention disclosed herein, a power supply circuit including the above detection circuit can be obtained.

BRIEF DESCRIPTION OF THE DRAWINGS

FIG. 11 is a circuit diagram of part of a power supply circuit.

DETAILED DESCRIPTION OF THE INVENTION

Figure 1:
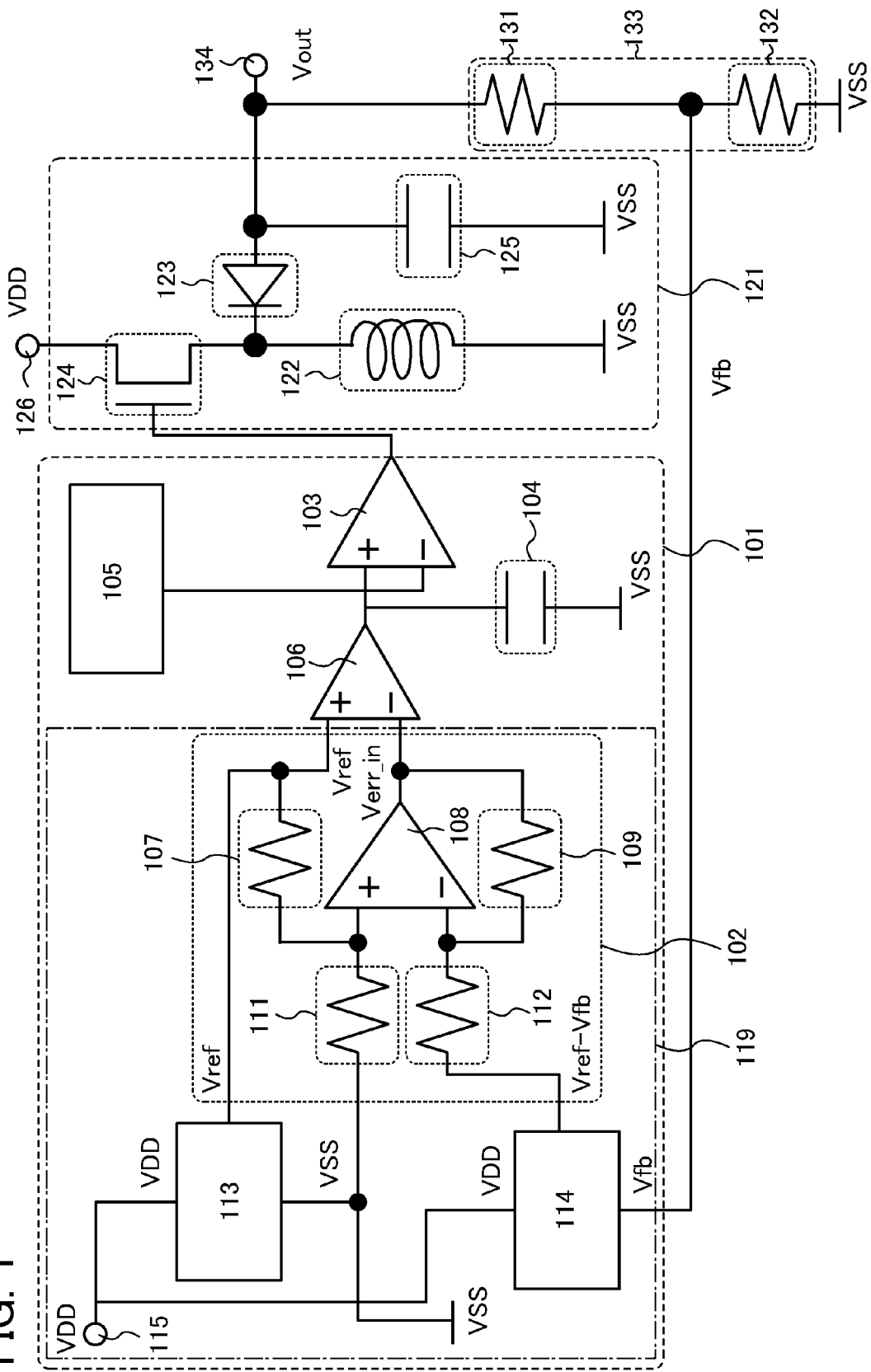
FIG. 1 is a circuit diagram of a power supply circuit.

Embodiment of the invention disclosed in this specification will be described below with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiment. Note that in the accompanying drawings, the same portions or portions having similar functions are denoted by the same reference numerals, and repetitive description thereof is omitted.

A power supply circuit of this embodiment is illustrated in FIG. 1. The power supply circuit illustrated in FIG. 1 includes an amplifier circuit 121, a divider circuit 133 electrically connected to the amplifier circuit 121, a control circuit 101 electrically connected to the amplifier circuit 121 and the divider circuit 133, and an output terminal 134 electrically connected to the amplifier circuit 121 and the divider circuit 133. Note that in the power supply circuit of FIG. 1, a step-up and step-down DC-DC converter is used as the amplifier circuit 121.

The amplifier circuit 121 illustrated in FIG. 1 includes a coil 122, a diode 123, a transistor 124, and a capacitor 125.

One of a source and a drain of the transistor 124 is electrically connected to an input terminal 126 to which a power source voltage VDD is applied. The other of the source and the drain of the transistor 124 is electrically connected to one of terminals of the coil 122 and an output terminal of the diode 123. A gate of the transistor 124 is electrically connected to an output terminal of a pulse width modulation (PWM) driver 103 in the control circuit 101.

The one of the terminals of the coil 122 is electrically connected to the other of the source and the drain of the transistor 124 and the output terminal of the diode 123. A power source voltage VSS (e.g., a ground voltage GND) which is lower than the power source voltage VDD is applied to the other of the terminals of the coil 122.

The output terminal of the diode 123 is electrically connected to the other of the source and the drain of the transistor 124 and the one of the terminals of the coil 122. An input terminal of the diode 123 is electrically connected to one of terminals of the capacitor 125, the output terminal 134 from which an output voltage Vout is output, and one of terminals of a resistor 131 in the divider circuit 133.

The one of the terminals of the capacitor 125 is electrically connected to the input terminal of the diode 123, the output terminal 134, and the one of the terminals of the resistor 131 in the divider circuit 133. A power source voltage VSS (e.g., a ground voltage GND) which is lower than the power source voltage VDD is applied to the other of the terminals of the capacitor 125.

The control circuit 101 illustrated in FIG. 1 includes the pulse width modulation driver 103, a capacitor 104, a triangle-wave generation circuit 105, an error amplifier circuit 106 (also referred to as an error amplifier), and a detection circuit 119. The detection circuit 119 includes an input signal adjustment circuit 102, a reference voltage generation circuit 113, and a reference voltage generation circuit 114.

A non-inverting input terminal of the pulse width modulation driver 103 is electrically connected to an output terminal of the error amplifier circuit 106 and one of terminals of the capacitor 104. An inverting input terminal of the pulse width modulation driver 103 is electrically connected to the triangle-wave generation circuit 105. The output terminal of the pulse width modulation driver 103 is electrically connected to the gate of the transistor 124 in the amplifier circuit 121.

The one of the terminals of the capacitor 104 is electrically connected to the non-inverting input terminal of the pulse width modulation driver 103 and the output terminal of the error amplifier circuit 106. A power source voltage VSS (e.g., a ground voltage GND) which is lower than a power source voltage VDD is applied to the other of the terminals of the capacitor 104.

A non-inverting input terminal of the error amplifier circuit 106 is electrically connected to a first terminal of the reference voltage generation circuit 113 and one of terminals of a resistor 107 in the input signal adjustment circuit 102. An inverting input terminal of the error amplifier circuit 106 is electrically connected to an output terminal of an operational amplifier 108 and one of terminals of a resistor 109 in the input signal adjustment circuit 102. The output terminal of the error amplifier circuit 106 is electrically connected to the non-inverting input terminal of the pulse width modulation driver 103 and the one of the terminals of the capacitor 104.

The input signal adjustment circuit 102 includes the resistor 107, the operational amplifier 108, the resistor 109, a resistor 111, and a resistor 112. In this embodiment, the resistance values of the resistor 111 and the resistor 112 are equal. Further, the resistance values of the resistor 107 and the resistor 109 are equal. The resistance values of the resistor 111 and the resistor 112 are each R1; and the resistance values of the resistor 107 and the resistor 109 are each R2.

The one of the terminals of the resistor 107 is electrically connected to the non-inverting input terminal of the error amplifier circuit 106 and the first terminal of the reference voltage generation circuit 113. The other of the terminals of the resistor 107 is electrically connected to a non-inverting input terminal of the operational amplifier 108 and one of terminals of the resistor 111.

The non-inverting input terminal of the operational amplifier 108 is electrically connected to the other of the terminals of the resistor 107 and the one of the terminals of the resistor 111. An inverting input terminal of the operational amplifier 108 is electrically connected to the other of terminals of the resistor 109 and one of terminals of the resistor 112. The output terminal of the operational amplifier 108 is electrically connected to the inverting input terminal of the error amplifier circuit 106 and the one of the terminals of the resistor 109.

The one of the terminals of the resistor 111 is electrically connected to the other of the terminals of the resistor 107 and the non-inverting input terminal of the operational amplifier 108. The other of the terminals of the resistor 111 is electrically connected to a second terminal of the reference voltage generation circuit 113; and a power source voltage VSS (e.g., a ground voltage GND) which is lower than a power source voltage VDD is applied to the other of the terminals of the resistor 111 and the second terminal of the reference voltage generation circuit 113.

The one of the terminals of the resistor 112 is electrically connected to the inverting input terminal of the operational amplifier 108 and the other of the terminals of the resistor 109. The other of the terminals of the resistor 112 is electrically connected to a first terminal of the reference voltage generation circuit 114.

The first terminal of the reference voltage generation circuit 113 which is a first reference voltage generation circuit is electrically connected to the one of the terminals of the resistor 107 in the input signal adjustment circuit 102 and the non-inverting input terminal of the error amplifier circuit 106. The second terminal of the reference voltage generation circuit 113 is electrically connected to the other of the terminals of the resistor 111 in the input signal adjustment circuit 102, and the power source voltage VSS (e.g., a ground voltage GND) which is lower than the power source voltage VDD is applied to the second terminal of the reference voltage generation circuit 113 and the other of the terminals of the resistor 111. A third terminal of the reference voltage generation circuit 113 is electrically connected to an input terminal 115 to which a power source voltage VDD is applied and a second terminal of the reference voltage generation circuit 114. Note that specific examples of the circuit configurations of the reference voltage generation circuit 113 and the reference voltage generation circuit 114 will be subsequently described.

The first terminal of the reference voltage generation circuit 114 which is a second reference voltage generation circuit is electrically connected to the other of the terminals of the resistor 112 in the input signal adjustment circuit 102. The second terminal of the reference voltage generation circuit 114 is electrically connected to the third terminal of the reference voltage generation circuit 113 and the input terminal 115. A third terminal of the reference voltage generation circuit 114 is electrically connected to the other of the terminals of the resistor 131 and one of terminals of a resistor 132 in the divider circuit 133. Further, a feedback voltage Vfb is input to the third terminal of the reference voltage generation circuit 114.

The divider circuit 133 includes the resistor 131 and the resistor 132.

The one of the terminals of the resistor 131 is electrically connected to the input terminal of the diode 123 and the one of the terminals of the capacitor 125 in the amplifier circuit 121 and the output terminal 134. The other of the terminals of the resistor 131 is electrically connected to the third terminal of the reference voltage generation circuit 114 and the one of the terminals of the resistor 132.

The one of the terminals of the resistor 132 is electrically connected to the other of the terminals of the resistor 131 and the third terminal of the reference voltage generation circuit 114. A power source voltage VSS (e.g., a ground voltage GND) which is lower than the power source voltage VDD is applied to the other of the terminals of the resistor 132.

The operation of the power supply circuit illustrated in FIG. 1 will be described below.

The output voltage Vout of the amplifier circuit 121 is divided depending on the ratio of the resistor 131 and the resistor 132 in the divider circuit 133. The feedback voltage Vfb which is a divided output voltage Vout is input from the third terminal of the reference voltage generation circuit 114.

The reference voltage generation circuit 113 outputs an output voltage Vref based on the power source voltage VDD input from the third terminal of the reference voltage generation circuit 113.

The reference voltage generation circuit 114 outputs an output voltage (Vref−Vfb) based on a power source voltage VDD input from the second terminal and the feedback voltage Vfb input from the third terminal of the reference voltage generation circuit 114.

Here, voltage input to the error amplifier circuit 106 will be described. The voltage input to the error amplifier circuit 106 is the output voltage Vref output from the first terminal of the reference voltage generation circuit 113 and a voltage Verr_in output from the output terminal of the operational amplifier 108. The voltage Verr_in is a voltage output from the error amplifier circuit 106, which is negatively fed back through the pulse width modulation driver 103, the amplifier circuit 121, the divider circuit 133, the reference voltage generation circuit 114, and the input signal adjustment circuit 102.

The error amplifier circuit 106 functions so that the levels of the output voltage Vref and the voltage Verr_in which are input become equal.

In addition, in the operational amplifier 108 of the input signal adjustment circuit 102, the inverting input terminal and the output terminal are connected to each other through the resistor 109. That is, in the operational amplifier 108, part of the output is negatively fed back to the input side. Since part of the output of the operational amplifier 108 is negatively fed back to the input side, the voltage input to the inverting input terminal and the voltage input to the non-inverting input terminal in the operational amplifier 108 become equal.

With the use of the output voltage Vref of the reference voltage generation circuit 113, the feedback voltage Vfb of the reference voltage generation circuit 114, the resistance value R1 of the resistor 111 and the resistor 112, and the resistance value R2 of the resistor 107 and the resistor 109, the voltage input to the non-inverting input terminal of the operational amplifier 108 is represented by the following Formula 1.

$$Vref \times R1/(R1+R2) \qquad [\text{FORMULA 1}]$$

Further, the voltage input to the inverting input terminal of the operational amplifier 108 is represented by the following Formula 2.

$$\{R1 \times (Verr\_in) + R2 \times (Vref-Vfb)\}/(R1+R2) \qquad [\text{FORMULA 2}]$$

Since the voltage input to the inverting input terminal and the voltage input to the non-inverting input terminal in the operational amplifier 108 become equal, Formula 1 and Formula 2 are equal.

$$Vref \times R1/(R1+R2) = \{R1 \times (Verr\_in) + R2 \times (Vref-Vfb)\}/(R1+R2) \qquad [\text{FORMULA 3}]$$

Formula 4 is obtained as the calculation result of Formula 3.

$$Verr\_in - Vref = (Vfb - Vref) \times (R2/R1) \qquad [\text{FORMULA 4}]$$

As described above, the error amplifier circuit 106 functions so that the levels of the output voltage Vref and the voltage Verr_in which are input become equal.

Accordingly, it is found that the levels of the output voltage Vref and the feedback voltage Vfb are equal.

As described above, in the power supply circuit of this embodiment, the detection circuit 119 including the reference voltage generation circuit 113, the reference voltage generation circuit 114, and the input signal adjustment circuit 102 can detect a feedback volage Vfb which is negative voltage.

Figure 2:
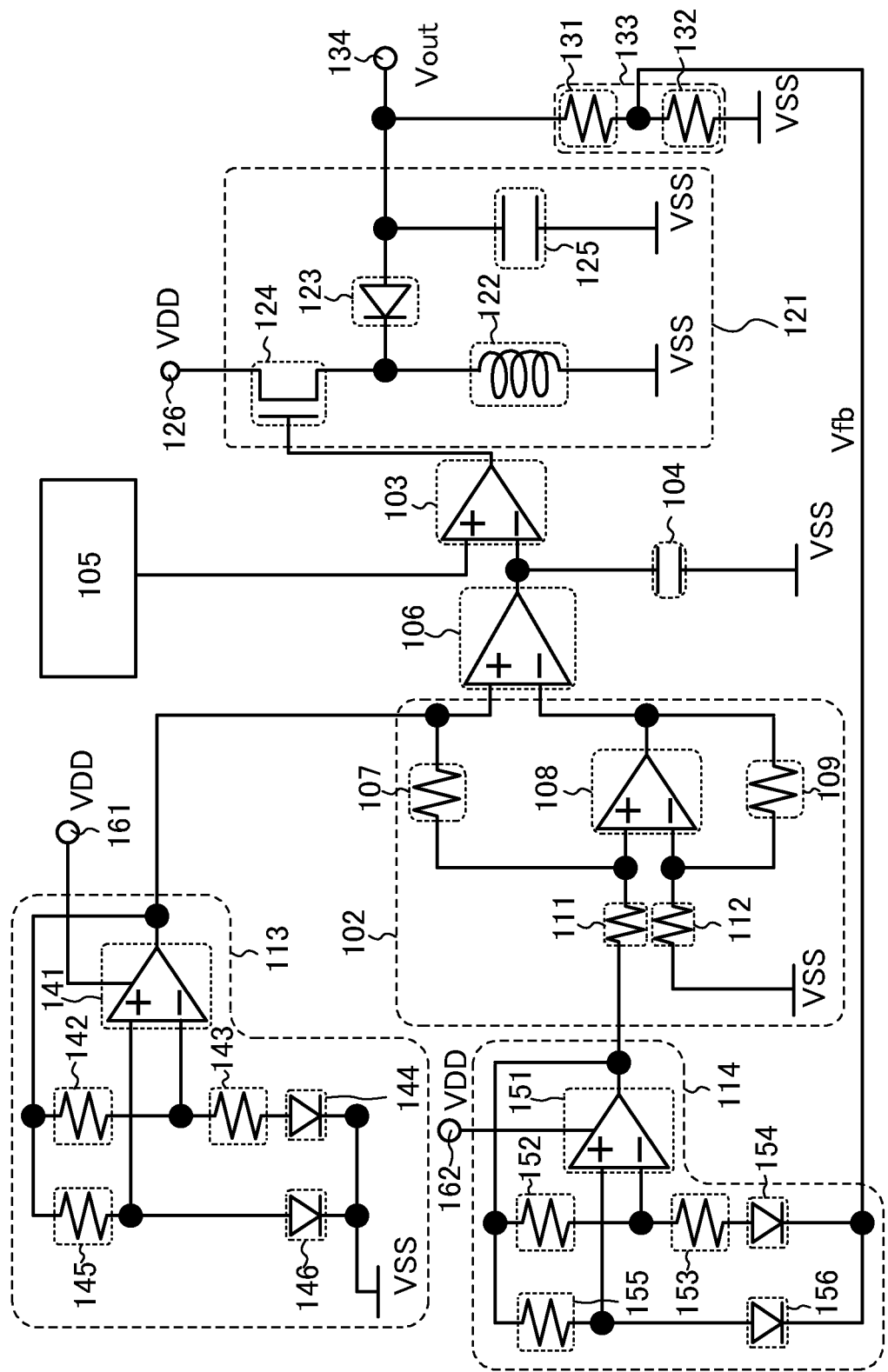
FIG. 2 is a circuit diagram of a power supply circuit.

A specific example of a circuit configuration of the reference voltage generation circuit 113 and the reference voltage generation circuit 114 which are each a band gap reference is shown in FIG. 2.

A reference voltage generation circuit 113 of FIG. 2 includes an operational amplifier 141, a resistor 142, a resistor 143, a diode 144, a resistor 145, and a diode 146.

A non-inverting input terminal of the operational amplifier 141 is electrically connected to one of terminals of the resistor 145 and an input terminal of the diode 146. An inverting input terminal of the operational amplifier 141 is electrically connected to one of terminals of the resistor 142 and one of terminals of the resistor 143. An output terminal of the operational amplifier 141 is electrically connected to the other of the terminals of the resistor 142 and the other of the terminals of the resistor 145. A power source voltage VDD is input to the operational amplifier 141 from a terminal 161.

The one of the terminals of the resistor 142 is electrically connected to the non-inverting input terminal of the operational amplifier 141 and the one of the terminals of the resistor 143. The other of the terminals of the resistor 142 is electrically connected to the output terminal of the operational amplifier 141 and the other of the terminals of the resistor 145.

The one of the terminals of the resistor 143 is electrically connected to the inverting input terminal of the operational amplifier 141 and the one of the terminals of the resistor 142.

The other of the terminals of the resistor 143 is electrically connected to an input terminal of the diode 144.

The input terminal of the diode 144 is electrically connected to the other of the terminals of the resistor 143. An output terminal of the diode 144 is electrically connected to an output terminal of the diode 146; and a power source voltage VSS (e.g., a ground voltage GND) which is lower than the power source voltage VDD is applied to the output terminal of the diode 144 and the output terminal of the diode 146.

The one of the terminals of the resistor 145 is electrically connected to the inverting input terminal of the operational amplifier 141 and the input terminal of the diode 146. The other of the terminals of the resistor 145 is electrically connected to the output terminal of the operational amplifier 141 and the other of the terminals of the resistor 142.

The input terminal of the diode 146 is electrically connected to the non-inverting input terminal of the operational amplifier 141 and the one of the terminals of the resistor 145. The output terminal of the diode 146 is electrically connected to the output terminal of the diode 144; and the power source voltage VSS (e.g., a ground voltage GND) which is lower than the power source voltage VDD is applied to the output terminal of the diode 146 and the output terminal of the diode 144.

A reference voltage generation circuit 114 includes an operational amplifier 151, a resistor 152, a resistor 153, a diode 154, a resistor 155, and a diode 156.

A non-inverting input terminal of the operational amplifier 151 is electrically connected to one of terminals of the resistor 155 and an input terminal of the diode 156. An inverting input terminal of the operational amplifier 151 is electrically connected to one of terminals of the resistor 152 and one of terminals of the resistor 153. An output terminal of the operational amplifier 151 is electrically connected to the other of the terminals of the resistor 152 and the other of the terminals of the resistor 155. A power source voltage VDD is input to the operational amplifier 151 from a terminal 162.

The one of the terminals of the resistor 152 is electrically connected to the non-inverting input terminal of the operational amplifier 151 and the one of the terminals of the resistor 153. The other of the terminals of the resistor 152 is electrically connected to the output terminal of the operational amplifier 151 and the other of the terminals of the resistor 155.

The one of the terminals of the resistor 153 is electrically connected to the non-inverting input terminal of the operational amplifier 151 and the one of the terminals of the resistor 152. The other of the terminals of the resistor 153 is electrically connected to an input terminal of the diode 154.

The input terminal of the diode 154 is electrically connected to the other of the terminals of the resistor 153. An output terminal of the diode 154 is electrically connected to an output terminal of the diode 156, and the other of terminals of a resistor 131 and one of terminals of a resistor 132 in a divider circuit 133.

The one of the terminals of the resistor 155 is electrically connected to the non-inverting input terminal of the operational amplifier 151 and the input terminal of the diode 156. The other of the terminals of the resistor 155 is electrically connected to the output terminal of the operational amplifier 151 and the other of the terminals of the resistor 152.

The input terminal of the diode 156 is electrically connected to the non-inverting input terminal of the operational amplifier 151 and the one of the terminals of the resistor 155. The output terminal of the diode 156 is electrically connected to the output terminal of the diode 154, and the other of the terminals of the resistor 131 and the one of the terminals of the resistor 132 in the divider circuit 133.

The reference voltage generation circuit 113 is a band gap reference including diodes (the diode 144 and the diode 146) which are elements utilizing band gap voltage and a resistor (the resistor 143). The reference voltage generation circuit 114 is a band gap reference including diodes (the diode 154 and the diode 156) which are elements utilizing band gap voltage and a resistor (the resistor 153). Therefore, an output voltage Vref of the reference voltage generation circuit 113 and an output voltage (Vref−Vfb) of the reference voltage generation circuit 114 do not vary by current; thus, high output stability can be obtained.

Since the reference voltage generation circuit 113 and the reference voltage generation circuit 114 are each a band gap reference, the output voltage Vref of the reference voltage generation circuit 113 and the output voltage (Vref−Vfb) of the reference voltage generation circuit 114 do not vary by the operation temperature; thus, high output stability can be obtained.

Note that the diode 144 and the diode 146 of the reference voltage generation circuit 113 and the diode 154 and the diode 156 of the reference voltage generation circuit 114 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 3:
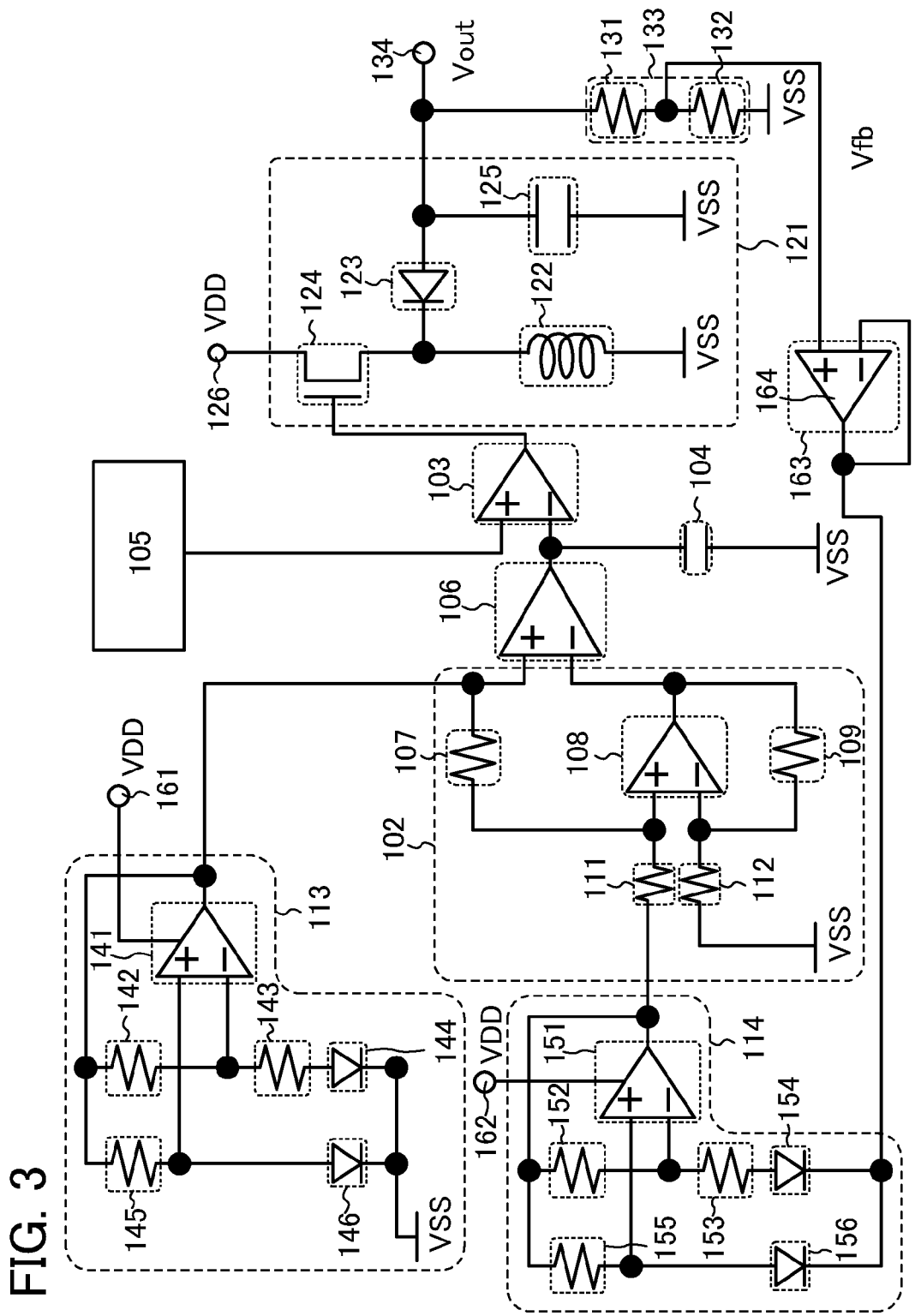
FIG. 3 is a circuit diagram of a power supply circuit.

A power supply circuit illustrated in FIG. 3 is a power supply circuit in which a buffer circuit 163 is provided in an input portion of the feedback voltage Vfb in the power supply circuit illustrated in FIG. 2. The buffer circuit 163 of FIG. 3 is a voltage follower including an operational amplifier 164.

In the voltage follower, the input-side impedance is high and the output-side impedance is low, and input voltage and output voltage are at the same levels. Therefore, when the voltage follower is provided, interference between a preceding stage and a subsequent stage of the voltage follower can be reduced. Thus, an internal resistor of a divider circuit 133 which is a preceding stage of the buffer circuit 163 which is a voltage follower and an input resistor of a reference voltage generation circuit 114 which is a subsequent stage of the buffer circuit 163 which is a voltage follower can be neglected. Accordingly, stabilization of the power supply circuit can be achieved.

A non-inverting input terminal of the operational amplifier 164 is electrically connected to the other of terminals of a resistor 131 and one of terminals of a resistor 132 in the divider circuit 133. An inverting input terminal of the operational amplifier 164 is electrically connected to an output terminal of the operational amplifier 164, and an output terminal of a diode 154 and an output terminal of a diode 156 in the reference voltage generation circuit 114. The output terminal of the operational amplifier 164 is electrically connected to the inverting input terminal of the operational amplifier 164, and the output terminal of the diode 154 and the output terminal of the diode 156 in the reference voltage generation circuit 114.

In the power supply circuit illustrated in FIG. 3 as well as the power supply circuit illustrated in FIG. 2, a reference voltage generation circuit 113 is a band gap reference including diodes (a diode 144 and a diode 146) which are elements utilizing band gap voltage and a resistor (a resistor 143). The reference voltage generation circuit 114 is a band gap reference including diodes (the diode 154 and the diode 156) which are elements utilizing band gap voltage and a resistor (a resistor 153). Therefore, an output voltage Vref of the reference voltage generation circuit 113 and an output voltage (Vref−Vfb) of the reference voltage generation circuit 114 do not vary by current; thus, high output stability can be obtained.

Since the reference voltage generation circuit 113 and the reference voltage generation circuit 114 are each a band gap reference, the output voltage Vref of the reference voltage generation circuit 113 and the output voltage (Vref−Vfb) of the reference voltage generation circuit 114 do not vary by the operation temperature; thus, high output stability can be obtained.

Note that the diode 144 and the diode 146 of the reference voltage generation circuit 113 and the diode 154 and the diode 156 of the reference voltage generation circuit 114 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 4:
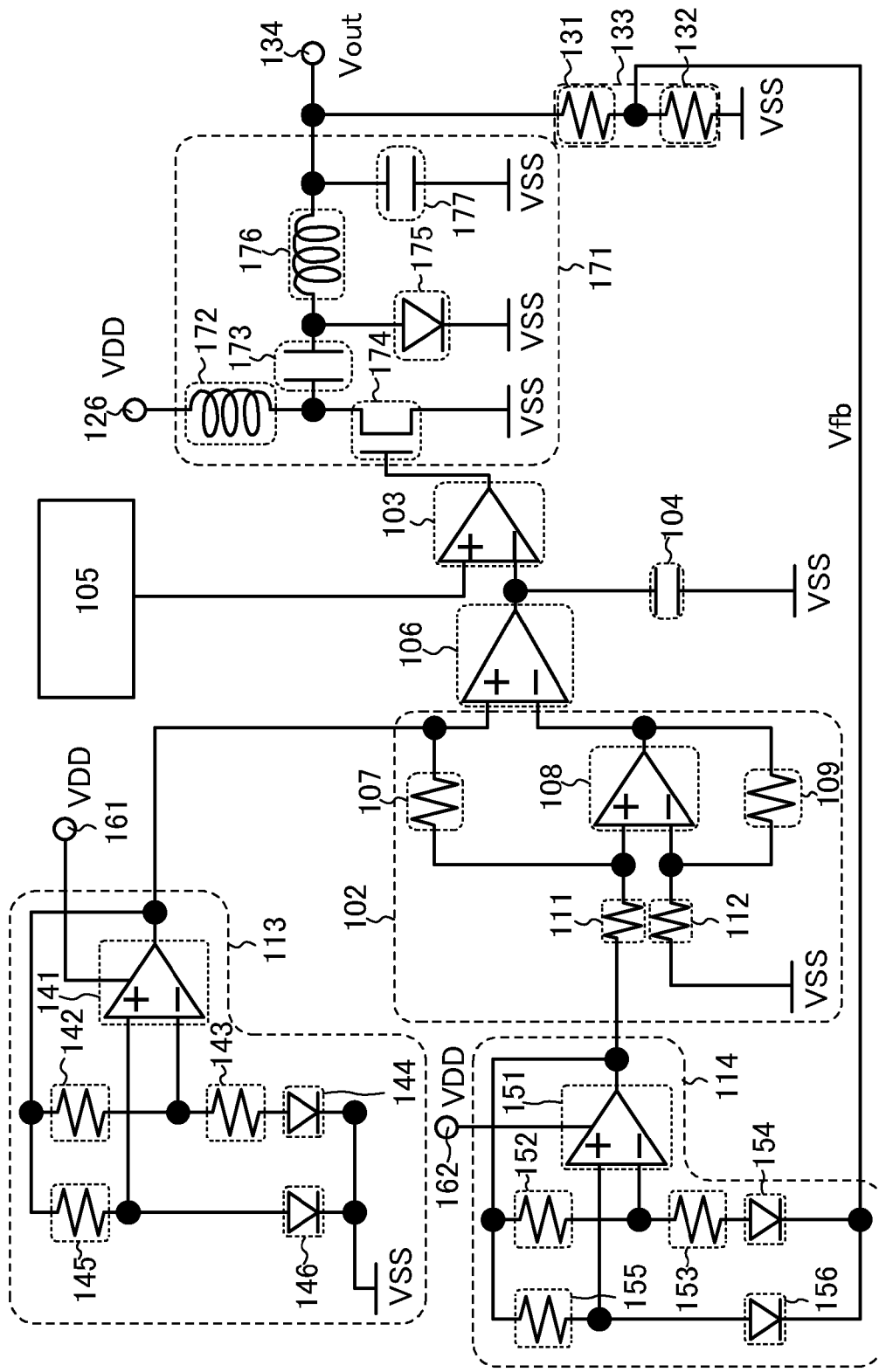
FIG. 4 is a circuit diagram of a power supply circuit.

A power supply circuit illustrated in FIG. 4 is a power supply circuit in which the amplifier circuit 121 in the power supply circuit illustrated in FIG. 2 is replaced with an amplifier circuit 171. The amplifier circuit 171 illustrated in FIG. 4 is a Cuk converter. Note that in FIG. 4, the same portions as those in FIG. 2 are denoted by the same reference numerals.

The amplifier circuit 171 includes a coil 172, a capacitor 173, a transistor 174, a diode 175, a coil 176, and a capacitor 177.

One of terminals of the coil 172 is electrically connected to an input terminal 126 to which a power source voltage VDD is applied. The other of the terminals of the coil 172 is electrically connected to one of a source and a drain of the transistor 174 and one of terminals of the capacitor 173.

The one of the terminals of the capacitor 173 is electrically connected to the other of the terminals of the coil 172 and the one of the source and the drain of the transistor 174. The other of the terminals of the capacitor 173 is electrically connected to an input terminal of the diode 175 and one of terminals of the coil 176.

The one of the source and the drain of the transistor 174 is electrically connected to the other of the terminals of the coil 172 and the one of the terminals of the capacitor 173. A power source voltage VSS (e.g., a ground voltage GND) which is lower than the power source voltage VDD is applied to the other of the source and the drain of the transistor 174. A gate of the transistor 174 is electrically connected to an output terminal of a pulse width modulation driver 103.

The input terminal of the diode 175 is electrically connected to the other of the terminals of the capacitor 173 and the one of the terminals of the coil 176. A power source voltage VSS (e.g., a ground voltage GND) which is lower than the power source voltage VDD is applied to an output terminal of the diode 175.

The one of the terminals of the coil 176 is electrically connected to the other of the terminals of the capacitor 173 and the input terminal of the diode 175. The other of the terminals of the coil 176 is electrically connected to one of terminals of the capacitor 177, an output terminal 134 from which an output voltage Vout is output, and one of terminals of a resistor 131 of a divider circuit 133.

The one of the terminals of the capacitor 177 is electrically connected to the other of the terminals of the coil 176, the output terminal 134, and the one of the terminals of the resistor 131 in the divider circuit 133. A power source voltage VSS (e.g., a ground voltage GND) which is lower than the power source voltage VDD is applied to the other of the terminals of the capacitor 177.

In the power supply circuit illustrated in FIG. 4 as well as the power supply circuit illustrated in FIG. 2, a reference voltage generation circuit 113 is a band gap reference including diodes (a diode 144 and a diode 146) which are elements utilizing band gap voltage and a resistor (a resistor 143). A reference voltage generation circuit 114 is a band gap reference including diodes (a diode 154 and a diode 156) which are elements utilizing band gap voltage and a resistor (a resistor 153). Therefore, an output voltage Vref of the reference voltage generation circuit 113 and an output voltage (Vref−Vfb) of the reference voltage generation circuit 114 do not vary by current; thus, high output stability can be obtained.

Since the reference voltage generation circuit 113 and the reference voltage generation circuit 114 are each a band gap reference, the output voltage Vref of the reference voltage generation circuit 113 and the output voltage (Vref−Vfb) of the reference voltage generation circuit 114 do not vary by the operation temperature; thus, high output stability can be obtained.

Note that the diode 144 and the diode 146 of the reference voltage generation circuit 113 and the diode 154 and the diode 156 of the reference voltage generation circuit 114 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 5:
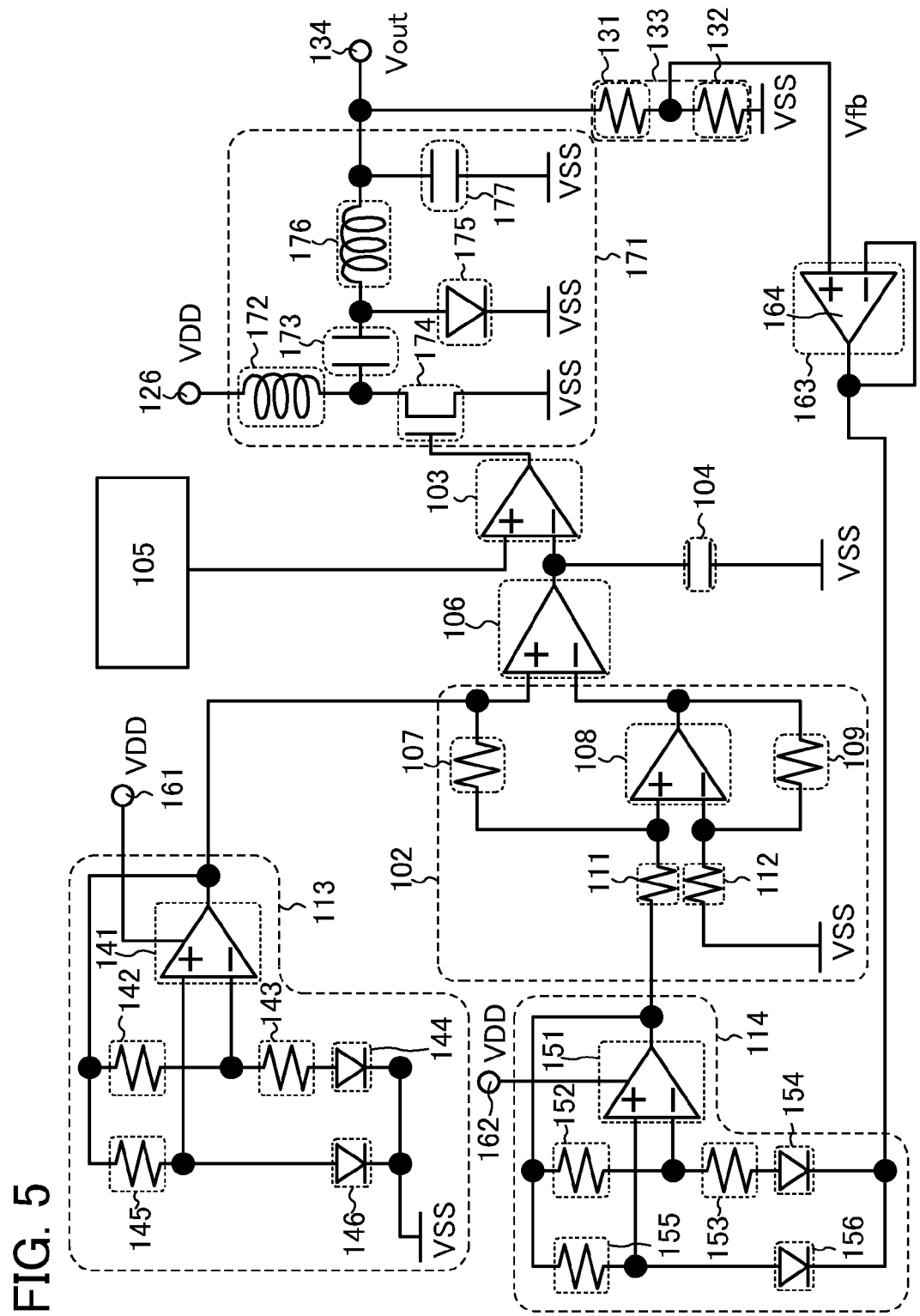
FIG. 5 is a circuit diagram of a power supply circuit.

A power supply circuit illustrated in FIG. 5 is a power supply circuit in which a buffer circuit 163 is provided in an input portion of the feedback voltage Vfb in the power supply circuit illustrated in FIG. 4. The buffer circuit 163 of FIG. 5 is a voltage follower including an operational amplifier 164.

In the voltage follower, the input-side impedance is high and the output-side impedance is low, and input voltage and output voltage are at the same levels. Therefore, when the voltage follower is provided, interference between a preceding stage and a subsequent stage of the voltage follower can be reduced. Thus, an internal resistor of a divider circuit 133 which is a preceding stage of the buffer circuit 163 which is a voltage follower and an input resistor of a reference voltage generation circuit 114 which is a subsequent stage of the buffer circuit 163 which is a voltage follower can be neglected. Accordingly, stabilization of the power supply circuit can be achieved.

A non-inverting input terminal of the operational amplifier 164 is electrically connected to the other of terminals of a resistor 131 and one of terminals of a resistor 132 in a divider circuit 133. An inverting input terminal of the operational amplifier 164 is electrically connected to an output terminal of the operational amplifier 164, and an output terminal of a diode 154 and an output terminal of a diode 156 in a reference voltage generation circuit 114. The output terminal of the operational amplifier 164 is electrically connected to the inverting input terminal of the operational amplifier 164, and the output terminal of the diode 154 and the output terminal of the diode 156 in the reference voltage generation circuit 114.

In the power supply circuit illustrated in FIG. 5 as well as the power supply circuit illustrated in FIG. 2, a reference voltage generation circuit 113 is a band gap reference including diodes (a diode 144 and a diode 146) which are elements utilizing band gap voltage and a resistor (a resistor 143). The reference voltage generation circuit 114 is a band gap reference including diodes (the diode 154 and the diode 156) which are elements utilizing band gap voltage and a resistor (a resistor 153). Therefore, an output voltage Vref of the reference voltage generation circuit 113 and an output voltage (Vref−Vfb) of the reference voltage generation circuit 114 do not vary by current; thus, high output stability can be obtained.

Since the reference voltage generation circuit 113 and the reference voltage generation circuit 114 are each a band gap reference, the output voltage Vref of the reference voltage generation circuit 113 and the output voltage (Vref−Vfb) of the reference voltage generation circuit 114 do not vary by the operation temperature; thus, high output stability can be obtained.

Note that the diode 144 and the diode 146 of the reference voltage generation circuit 113 and the diode 154 and the diode 156 of the reference voltage generation circuit 114 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 6:
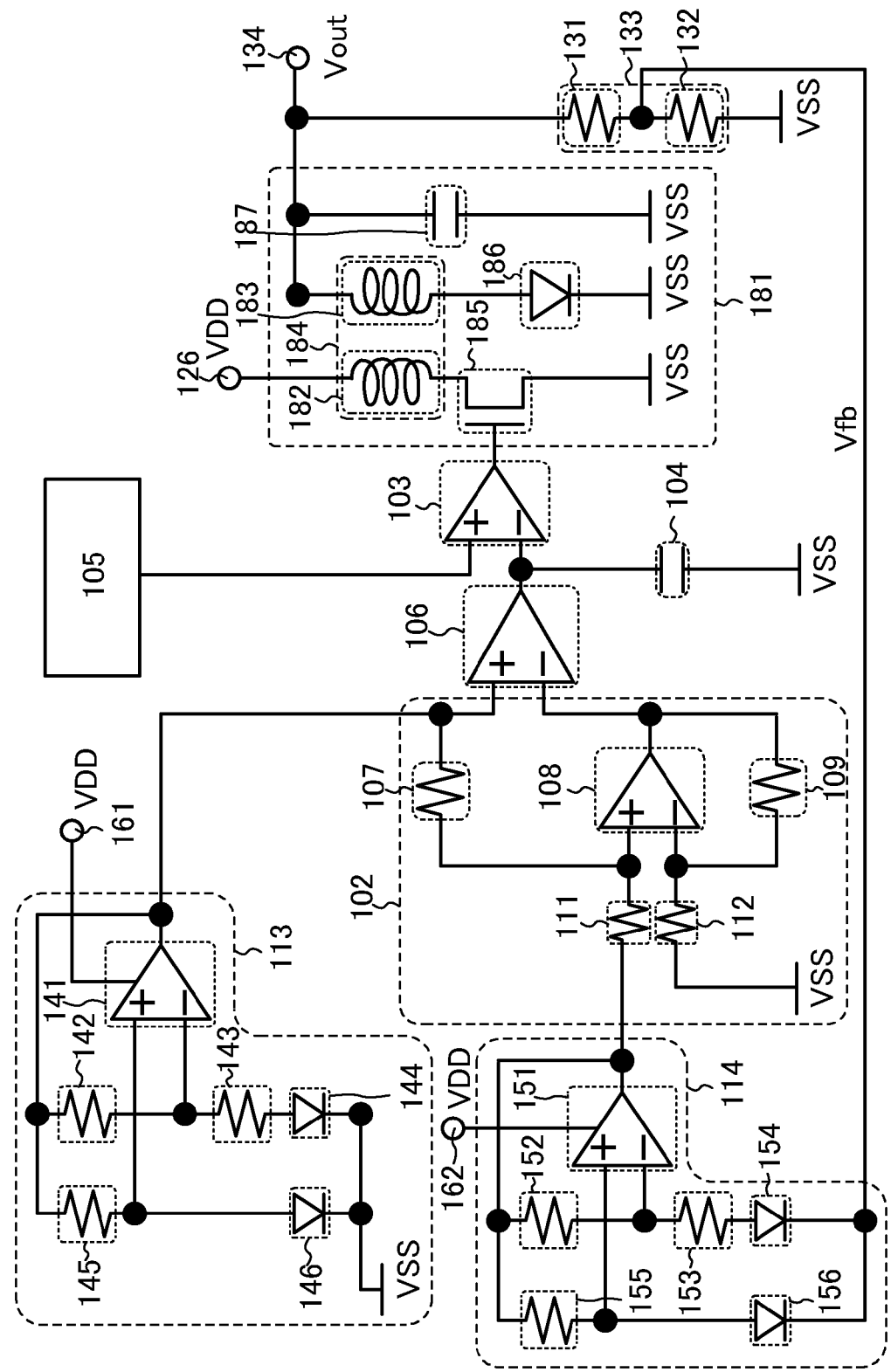
FIG. 6 is a circuit diagram of a power supply circuit.

A power supply circuit illustrated in FIG. 6 is a power supply circuit in which the amplifier circuit 121 in the power supply circuit illustrated in FIG. 2 is replaced with an amplifier circuit 181. The amplifier circuit 181 illustrated in FIG. 6 is a fly-back converter. Note that in FIG. 6, the same portions as those in FIG. 2 are denoted by the same reference numerals.

The amplifier circuit 181 includes a transformer 184 including a coil 182 and a coil 183, a transistor 185, a diode 186, and a capacitor 187.

One of terminals of the coil 182 is electrically connected to an input terminal 126 to which a power source voltage VDD is applied. The other of the terminals of the coil 182 is electrically connected to one of a source and a drain of the transistor 185.

One of terminals of the coil 183 is electrically connected to one of terminals of the capacitor 187, an output terminal 134 from which an output voltage Vout is output, and one of terminals of a resistor 131 in a divider circuit 133. The other of the terminals of the coil 183 is electrically connected to an input terminal of the diode 186.

The one of the source and the drain of the transistor 185 is electrically connected to the other of the terminals of the coil 182. A power source voltage VSS (e.g., a ground voltage GND) which is lower than the power source voltage VDD is applied to the other of the source and the drain of the transistor 185. A gate of the transistor 185 is electrically connected to an output terminal of a pulse width modulation driver 103.

The input terminal of the diode 186 is electrically connected to the other of the terminals of the coil 183. A power source voltage VSS (e.g., a ground voltage GND) which is lower than the power source voltage VDD is applied to an output terminal of the diode 186.

The one of the terminals of the capacitor 187 is electrically connected to the one of the terminals of the coil 183, the output terminal 134, and the one of the terminals of the resistor 131 in the divider circuit 133. A power source voltage VSS (e.g., a ground voltage GND) which is lower than the power source voltage VDD is applied to the other of the terminals of the capacitor 187.

In the power supply circuit illustrated in FIG. 6 as well as the power supply circuit illustrated in FIG. 2, a reference voltage generation circuit 113 is a band gap reference including diodes (a diode 144 and a diode 146) which are elements utilizing band gap voltage and a resistor (a resistor 143). A reference voltage generation circuit 114 is a band gap reference including diodes (a diode 154 and a diode 156) which are elements utilizing band gap voltage and a resistor (a resistor 153). Therefore, an output voltage Vref of the reference voltage generation circuit 113 and an output voltage (Vref−Vfb) of the reference voltage generation circuit 114 do not vary by current; thus, high output stability can be obtained.

Since the reference voltage generation circuit 113 and the reference voltage generation circuit 114 are each a band gap reference, the output voltage Vref of the reference voltage generation circuit 113 and the output voltage (Vref−Vfb) of the reference voltage generation circuit 114 do not vary by the operation temperature; thus, high output stability can be obtained.

Note that the diode 144 and the diode 146 of the reference voltage generation circuit 113 and the diode 154 and the diode 156 of the reference voltage generation circuit 114 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 7:
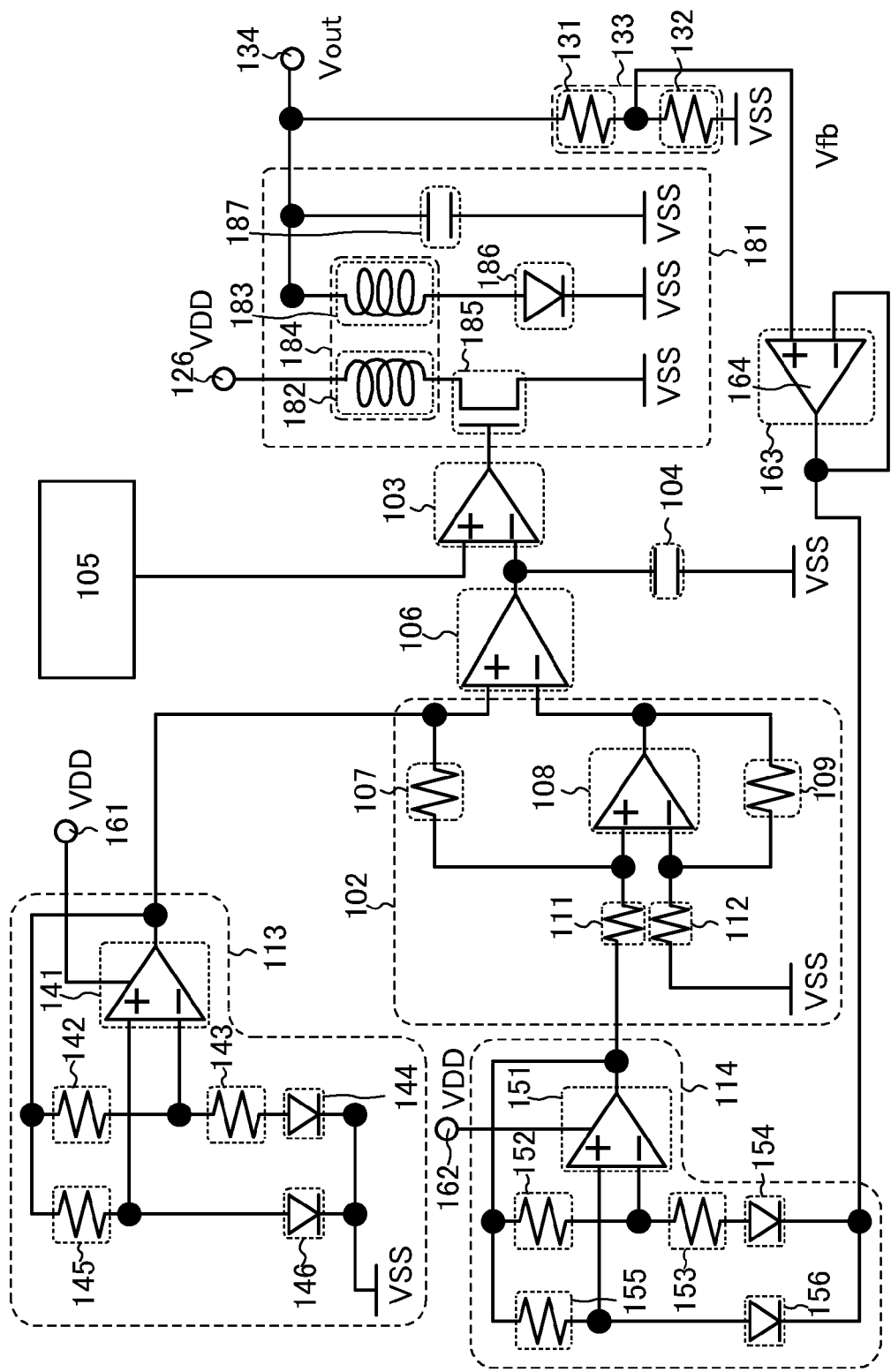
FIG. 7 is a circuit diagram of a power supply circuit.

A power supply circuit illustrated in FIG. 7 is a power supply circuit in which a buffer circuit 163 is provided in an input portion of the feedback voltage Vfb in the power supply circuit illustrated in FIG. 6. The buffer circuit 163 of FIG. 7 is a voltage follower including an operational amplifier 164.

In the voltage follower, the input-side impedance is high and the output-side impedance is low, and input voltage and output voltage are at the same levels. Therefore, when the voltage follower is provided, interference between a preceding stage and a subsequent stage of the voltage follower can be reduced. Thus, an internal resistor of a divider circuit 133 which is a preceding stage of the buffer circuit 163 which is a voltage follower and an input resistor of a reference voltage generation circuit 114 which is a subsequent stage of the buffer circuit 163 which is a voltage follower can be neglected. Accordingly, stabilization of the power supply circuit can be achieved.

A non-inverting input terminal of the operational amplifier 164 is electrically connected to the other of terminals of a resistor 131 and one of terminals of a resistor 132 in the divider circuit 133. An inverting input terminal of the operational amplifier 164 is electrically connected to an output terminal of the operational amplifier 164, and an output terminal of a diode 154 and an output terminal of a diode 156 in the reference voltage generation circuit 114. The output terminal of the operational amplifier 164 is electrically connected to the inverting input terminal of the operational amplifier 164, and the output terminal of the diode 154 and the output terminal of the diode 156 in the reference voltage generation circuit 114.

In the power supply circuit illustrated in FIG. 7 as well as the power supply circuit illustrated in FIG. 2, a reference voltage generation circuit 113 is a band gap reference including diodes (a diode 144 and a diode 146) which are elements utilizing band gap voltage and a resistor (a resistor 143). The reference voltage generation circuit 114 is a band gap reference including diodes (the diode 154 and the diode 156) which are elements utilizing band gap voltage and a resistor (a resistor 153). Therefore, an output voltage Vref of the reference voltage generation circuit 113 and an output voltage (Vref−Vfb) of the reference voltage generation circuit 114 do not vary by current; thus, high output stability can be obtained.

Since the reference voltage generation circuit 113 and the reference voltage generation circuit 114 are each a band gap reference, the output voltage Vref of the reference voltage generation circuit 113 and the output voltage (Vref−Vfb) of the reference voltage generation circuit 114 do not vary by the operation temperature; thus, high output stability can be obtained.

Note that the diode 144 and the diode 146 of the reference voltage generation circuit 113 and the diode 154 and the diode 156 of the reference voltage generation circuit 114 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 8:
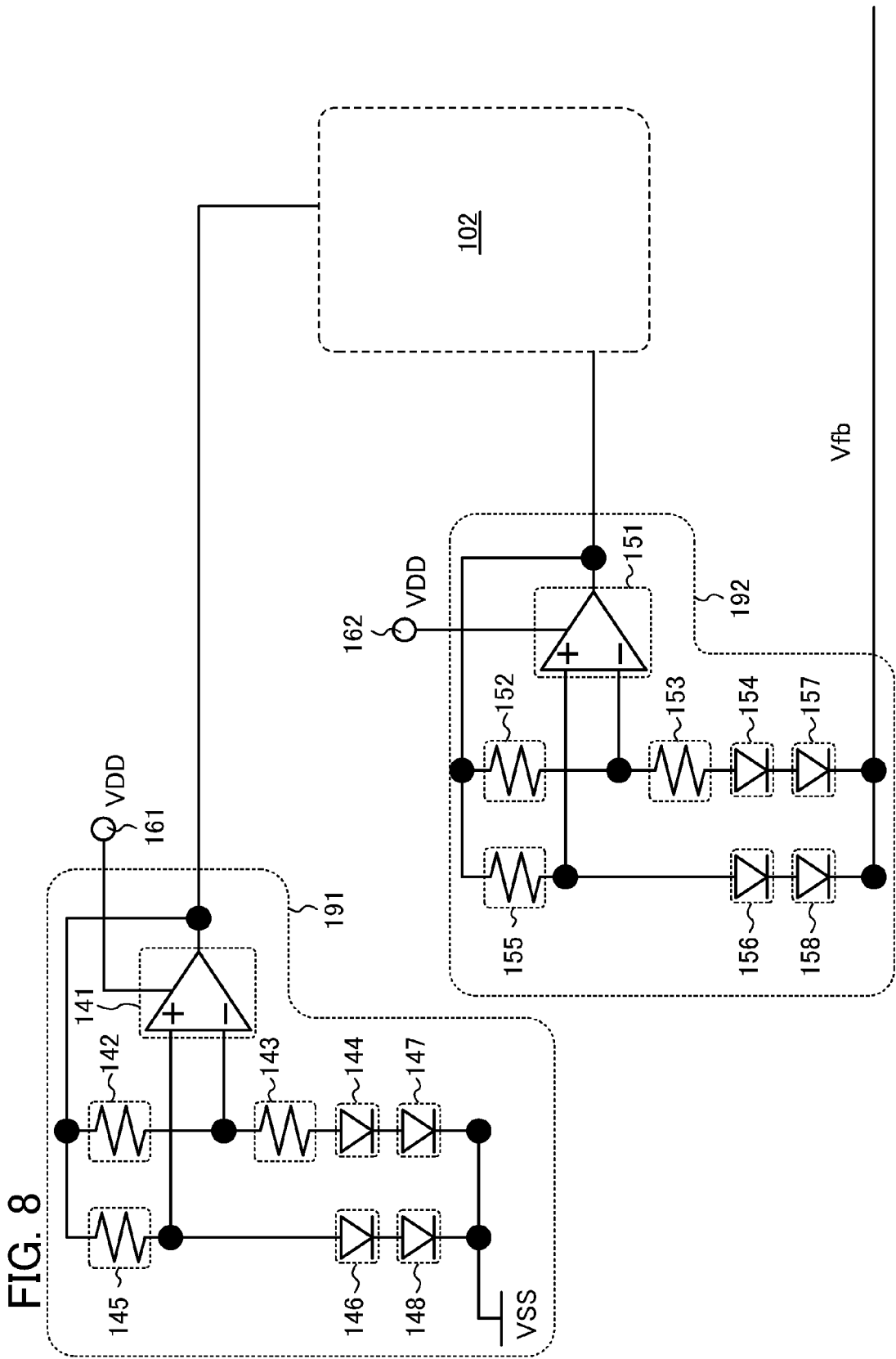
FIG. 8 is a circuit diagram of part of a power supply circuit.

A circuit configuration including a reference voltage generation circuit 191 and a reference voltage generation circuit 192 is illustrated in FIG. 8, which is different from the circuit configurations each including the reference voltage generation circuit 113 and the reference voltage generation circuit 114 illustrated in FIG. 2, FIG. 3, FIG. 4, FIG. 5, FIG. 6, and FIG. 7. Note that the reference voltage generation circuit 113 and the reference voltage generation circuit 114 illustrated in FIG. 2, FIG. 3, FIG. 4, FIG. 5, FIG. 6, and FIG. 7 can be replaced with the reference voltage generation circuit 191 and the reference voltage generation circuit 192, respectively.

The reference voltage generation circuit 191 which is a first reference voltage generation circuit includes an operational amplifier 141, a resistor 142, a resistor 143, a diode 144, a resistor 145, a diode 146, a diode 147, and a diode 148. The connections of the operational amplifier 141, the resistor 142, the resistor 143, the diode 144, and the resistor 145 are similar to those in FIG. 2; therefore, the description of FIG. 2 is employed.

An input terminal of the diode 144 is electrically connected to the other of terminals of the resistor 143. An output terminal of the diode 144 is electrically connected to an input terminal of the diode 147.

An input terminal of the diode 146 is electrically connected to a non-inverting input terminal of the operational amplifier 141 and the one of terminals of the resistor 145. An output terminal of the diode 146 is electrically connected to an input terminal of the diode 148.

The input terminal of the diode 147 is electrically connected to the output terminal of the diode 144. An output terminal of the diode 147 is electrically connected to an output terminal of the diode 148, and a power source voltage VSS (e.g., a ground voltage GND) which is lower than power source voltage VDD is applied to the output terminal of the diode 147 and the output terminal of the diode 148.

The input terminal of the diode 148 is electrically connected to the output terminal of the diode 146. The output terminal of the diode 148 is electrically connected to the output terminal of the diode 147, and the power source voltage VSS (e.g., a ground voltage GND) which is lower than power source voltage VDD is applied to the output terminal of the diode 148.

The reference voltage generation circuit 192 which is a second reference voltage generation circuit includes an operational amplifier 151, a resistor 152, a resistor 153, a diode 154, a resistor 155, a diode 156, a diode 157, and a diode 158. The connections of the operational amplifier 151, the resistor 152, the resistor 153, the diode 154, and the resistor 155 are similar to those in FIG. 2; therefore, the description of FIG. 2 is employed.

An input terminal of the diode 154 is electrically connected to the other of terminals of the resistor 153. An output terminal of the diode 154 is electrically connected to an input terminal of the diode 157.

An input terminal of the diode 156 is electrically connected to a non-inverting input terminal of the operational amplifier 151 and the one of terminals of the resistor 155. An output terminal of the diode 156 is electrically connected to an input terminal of the diode 158.

The input terminal of the diode 157 is electrically connected to the output terminal of the diode 154. An output terminal of the diode 157 is electrically connected to an output terminal of the diode 158, and a feedback voltage Vfb from a divider circuit 133 is input to the output terminal of the diode 157 and the output terminal of the diode 158.

The input terminal of the diode 158 is electrically connected to the output terminal of the diode 156. The output terminal of the diode 158 is electrically connected to the output terminal of the diode 157, and the feedback voltage Vfb from the divider circuit 133 is input to the output terminal of the diode 158 and the output terminal of the diode 157.

As illustrated in FIG. 8, in the reference voltage generation circuit 191, the diode 144 and the diode 147, and the diode 146 and the diode 148 are connected in series. When two diodes are connected in series, the output voltage is twice as high as the band gap voltage (the output voltage of the reference voltage generation circuit 113 illustrated in FIG. 2). Further, the reference voltage generation circuit 192 has a similar principle, in which the output voltage is twice as high as the output voltage of the reference voltage generation circuit 114 illustrated in FIG. 2.

In the power supply circuit illustrated in FIG. 8, the reference voltage generation circuit 191 is a band gap reference including diodes (the diode 144, the diode 146, the diode 147, and the diode 148) which are elements utilizing band gap voltage and a resistor (the resistor 143). The reference voltage generation circuit 192 is a band gap reference including diodes (the diode 154, the diode 156, the diode 157, and the diode 158) which are elements utilizing band gap voltage and a resistor (the resistor 153). Therefore, an output voltage Vref of the reference voltage generation circuit 191 and an output voltage (Vref−Vfb) of the reference voltage generation circuit 192 do not vary by current; thus, high output stability can be obtained.

Since the reference voltage generation circuit 191 and the reference voltage generation circuit 192 are each a band gap reference, the output voltage Vref of the reference voltage generation circuit 191 and the output voltage (Vref−Vfb) of the reference voltage generation circuit 192 do not vary by the operation temperature; thus, high output stability can be obtained.

Note that the diode 144, the diode 146, the diode 147, and the diode 148 of the reference voltage generation circuit 191 and the diode 154, the diode 156, the diode 157, and the diode 158 of the reference voltage generation circuit 192 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 9:
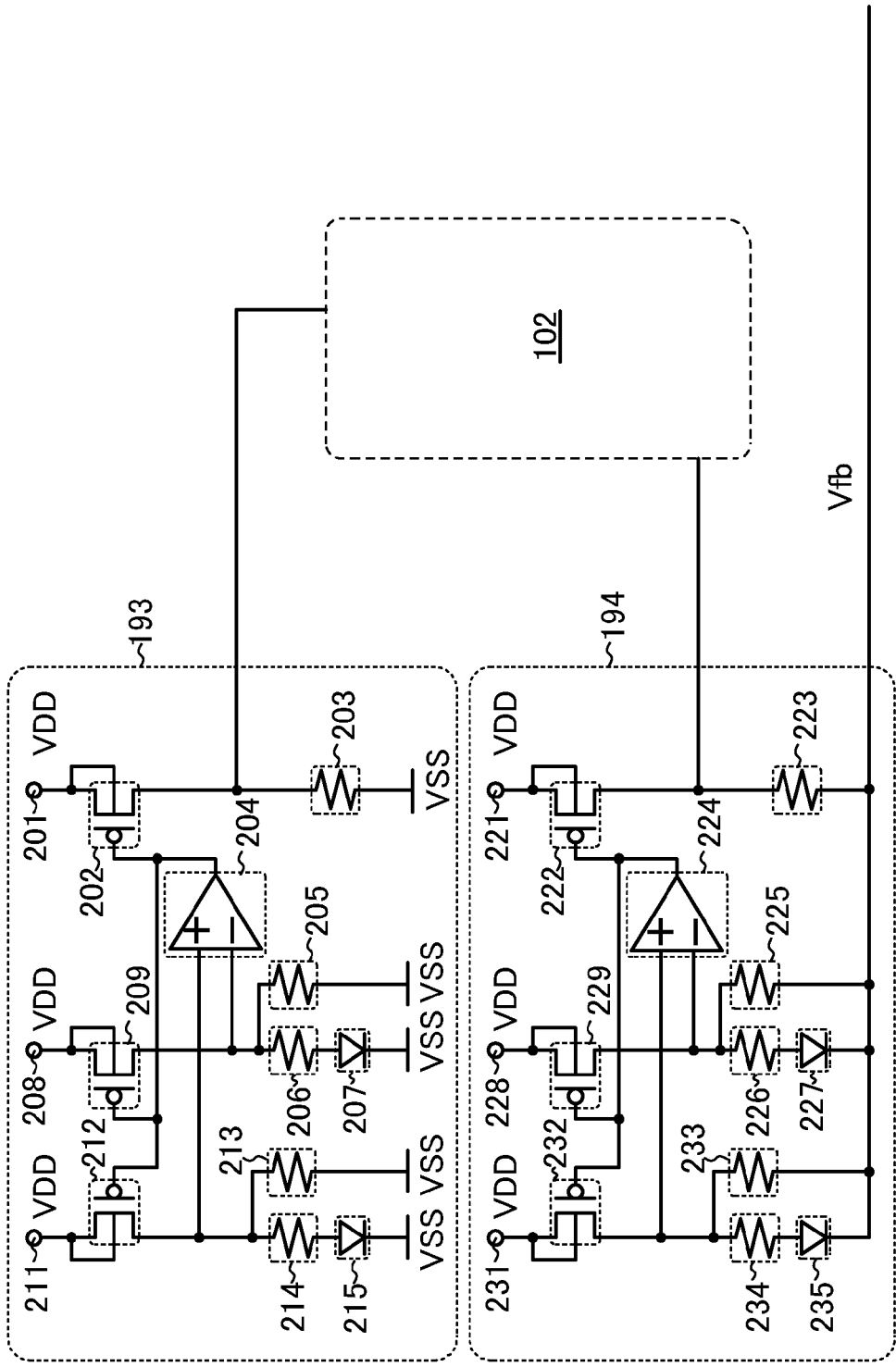
FIG. 9 is a circuit diagram of part of a power supply circuit.

A circuit configuration including a reference voltage generation circuit 193 and a reference voltage generation circuit 194 is illustrated in FIG. 9, which is different from the circuit configurations each including the reference voltage generation circuit 113 and the reference voltage generation circuit 114 illustrated in FIG. 2, FIG. 3, FIG. 4, FIG. 5, FIG. 6, and FIG. 7. Note that the reference voltage generation circuit 113 and the reference voltage generation circuit 114 illustrated in FIG. 2, FIG. 3, FIG. 4, FIG. 5, FIG. 6, and FIG. 7 can be replaced with the reference voltage generation circuit 193 and the reference voltage generation circuit 194, respectively.

The reference voltage generation circuit 193 which is a first reference voltage generation circuit includes a terminal 201, a p-channel transistor 202, a resistor 203, an operational amplifier 204, a terminal 208, a p-channel transistor 209, a resistor 205, a resistor 206, a diode 207, a terminal 211, a p-channel transistor 212, a resistor 213, a resistor 214, and a diode 215.

One of a source and a drain of the p-channel transistor 202 is electrically connected to the following: the terminal 201 to which a power source voltage VDD is applied; a gate of the p-channel transistor 202; an output terminal of the operational amplifier 204; a gate of the p-channel transistor 209; one of a source and a drain of the p-channel transistor 209; the terminal 208 to which a power source voltage VDD is applied; a gate of the p-channel transistor 212; one of a source and a drain of the p-channel transistor 212; and the terminal 211 to which a power source voltage VDD is applied. The other of the source and the drain of the p-channel transistor 202 is electrically connected to an input signal adjustment circuit 102 and one of terminals of the resistor 203. The gate of the p-channel transistor 202 is electrically connected to the following: the one of the source and the drain of the p-channel transistor 202; the terminal 201 to which the power source voltage VDD is applied; the output terminal of the operational amplifier 204; the gate of the p-channel transistor 209; the one of the source and the drain of the p-channel transistor 209; the terminal 208 to which the power source voltage VDD is applied; the gate of the p-channel transistor 212; the one of the source and the drain of the p-channel transistor 212; and the terminal 211 to which the power source voltage VDD is applied.

The one of the terminals of the resistor 203 is electrically connected to the other of the source and the drain of the p-channel transistor 202 and the input signal adjustment circuit 102. A power source voltage VSS (e.g., a ground voltage GND) which is lower than the power source voltage VDD is applied to the other of the terminals of the resistor 203.

A non-inverting input terminal of the operational amplifier 204 is electrically connected to the other of the source and the drain of the p-channel transistor 212, one of terminals of the resistor 213, and one of terminals of the resistor 214. An inverting input terminal of the operational amplifier 204 is electrically connected to the other of the source and the drain of the p-channel transistor 209, one of terminals of the resistor 205, and one of terminals of the resistor 206. The output terminal of the operational amplifier 204 is electrically connected to the following: the gate of the p-channel transistor 202; the one of the source and the drain of the p-channel transistor 202; the terminal 201 to which the power source voltage VDD is applied; the gate of the p-channel transistor 209; the one of the source and the drain of the p-channel transistor 209; the terminal 208 to which the power source voltage VDD is applied; the gate of the p-channel transistor 212; the one of the source and the drain of the p-channel transistor 212; and the terminal 211 to which the power source voltage VDD is applied.

The one of the source and the drain of the p-channel transistor 209 is electrically connected to the following: the terminal 208 to which the power source voltage VDD is applied; the gate of the p-channel transistor 209; the gate of the p-channel transistor 202; the one of the source and the drain of the p-channel transistor 202; the terminal 201 to which the power source voltage VDD is applied; the output terminal of the operational amplifier 204; the gate of the p-channel transistor 212; the one of the source and the drain of the p-channel transistor 212; and the terminal 211 to which the power source voltage VDD is applied. The other of the source and the drain of the p-channel transistor 209 is electrically connected to the inverting input terminal of the operational amplifier 204, the one of the terminals of the resistor 205, and the one of the terminals of the resistor 206. The gate of the p-channel transistor 209 is electrically connected to the following: the one of the source and the drain of the p-channel transistor 209; the terminal 208 to which the power source voltage VDD is applied; the gate of the p-channel transistor 202; the one of the source and the drain of the p-channel transistor 202; the terminal 201 to which the power source voltage VDD is applied; the output terminal of the operational amplifier 204; the gate of the p-channel transistor 212; the one of the source and the drain of the p-channel transistor 212; and the terminal 211 to which the power source voltage VDD is applied.

The one of the terminals of the resistor 205 is electrically connected to the inverting input terminal of the operational amplifier 204, the other of the source and the drain of the p-channel transistor 209, and the one of the terminals of the resistor 206. A power source voltage VSS (e.g., a ground voltage GND) which is lower than the power source voltage VDD is applied to the other of the terminals of the resistor 205.

The one of the terminals of the resistor 206 is electrically connected to the other of the source and the drain of the p-channel transistor 209, the inverting input terminal of the operational amplifier 204, and the one of the terminals of the resistor 205. The other of the terminals of the resistor 206 is electrically connected to an input terminal of the diode 207.

The input terminal of the diode 207 is electrically connected to the other of the terminals of the resistor 206. A power source voltage VSS (e.g., a ground voltage GND) which is lower than the power source voltage VDD is applied to an output terminal of the diode 207.

The one of the source and the drain of the p-channel transistor 212 is electrically connected to the following: the gate of the p-channel transistor 212; the terminal 211 to which the power source voltage VDD is applied; the gate of the p-channel transistor 202; the one of the source and the drain of the p-channel transistor 202; the terminal 201 to which the power source voltage VDD is applied; the output terminal of the operational amplifier 204; the gate of the p-channel transistor 209; the one of the source and the drain of the p-channel transistor 209; and the terminal 208 to which the power source voltage VDD is applied. The other of the source and the drain of the p-channel transistor 212 is electrically connected to the non-inverting input terminal of the operational amplifier 204, the one of the terminals of the resistor 213, and the one of the terminals of the resistor 214. The gate of the p-channel transistor 212 is electrically connected to the following: the one of the source and the drain of the p-channel transistor 212; the terminal 211 to which the power source voltage VDD is applied; the gate of the p-channel transistor 202; the one of the source and the drain of the p-channel transistor 202; the terminal 201 to which the power source voltage VDD is applied; the output terminal of the operational amplifier 204; the gate of the p-channel transistor 209; the one of the source and the drain of the p-channel transistor 209; and the terminal 208 to which the power source voltage VDD is applied.

The one of the terminals of the resistor 213 is electrically connected to the other of the source and the drain of the p-channel transistor 212, the non-inverting input terminal of the operational amplifier 204, and the one of the terminals of the resistor 214. A power source voltage VSS (e.g., a ground voltage GND) which is lower than the power source voltage VDD is applied to the other of the terminals of the resistor 213.

The one of the terminals of the resistor 214 is electrically connected to the other of the source and the drain of the p-channel transistor 212, the non-inverting input terminal of the operational amplifier 204, and the one of the terminals of the resistor 213. The other of the terminals of the resistor 214 is electrically connected to an input terminal of the diode 215.

The input terminal of the diode 215 is electrically connected to the other of the terminals of the resistor 214. A power source voltage VSS (e.g., a ground voltage GND) which is lower than the power source voltage VDD is applied to an output terminal of the diode 215.

The reference voltage generation circuit 194 which is a second reference voltage generation circuit includes a terminal 221, a p-channel transistor 222, a resistor 223, an operational amplifier 224, a terminal 228, a p-channel transistor 229, a resistor 225, a resistor 226, a diode 227, a terminal 231, a p-channel transistor 232, a resistor 233, a resistor 234, and a diode 235.

One of a source and a drain of the p-channel transistor 222 is electrically connected to the following: the terminal 221 to which a power source voltage VDD is applied; a gate of the p-channel transistor 222; an output terminal of the operational amplifier 224; a gate of the p-channel transistor 229; one of a source and a drain of the p-channel transistor 229; the terminal 228 to which a power source voltage VDD is applied; a gate of the p-channel transistor 232; one of a source and a drain of the p-channel transistor 232; and the terminal 231 to which a power source voltage VDD is applied. The other of the source and the drain of the p-channel transistor 222 is electrically connected to the input signal adjustment circuit 102 and one of terminals of the resistor 223. The gate of the p-channel transistor 222 is electrically connected to the following: the one of the source and the drain of the p-channel transistor 222; the terminal 221 to which the power source voltage VDD is applied; the output terminal of the operational amplifier 224; the gate of the p-channel transistor 229; the one of the source and the drain of the p-channel transistor 229; the terminal 228 to which the power source voltage VDD is applied; the gate of the p-channel transistor 232; the one of the source and the drain of the p-channel transistor 232; and the terminal 231 to which the power source voltage VDD is applied.

The one of the terminals of the resistor 223 is electrically connected to the other of the source and the drain of the p-channel transistor 222 and the input signal adjustment circuit 102. The other of the terminals of the resistor 223 is electrically connected to the other of terminals of the resistor 225, an output terminal of the diode 227, the other of terminals of the resistor 233, and an output terminal of the diode 235; and a feedback voltage Vfb from a divider circuit 133 is input to the other of the terminals of the resistor 223, the other of terminals of the resistor 225, the output terminal of the diode 227, the other of terminals of the resistor 233, and the output terminal of the diode 235.

A non-inverting input terminal of the operational amplifier 224 is electrically connected to the other of the source and the drain of the p-channel transistor 232, one of the terminals of the resistor 233, and one of terminals of the resistor 234. An inverting input terminal of the operational amplifier 224 is electrically connected to the other of the source and the drain of the p-channel transistor 229, one of the terminals of the resistor 225, and one of terminals of the resistor 226. The output terminal of the operational amplifier 224 is electrically connected to the following: the gate of the p-channel transistor 222; the one of the source and the drain of the p-channel transistor 222; the terminal 221 to which the power source voltage VDD is applied; the gate of the p-channel transistor 229; the one of the source and the drain of the p-channel transistor 229; the terminal 228 to which the power source voltage VDD is applied; the gate of the p-channel transistor 232; the one of the source and the drain of the p-channel transistor 232; and the terminal 231 to which the power source voltage VDD is applied.

The one of the source and the drain of the p-channel transistor 229 is electrically connected to the following: the gate of the p-channel transistor 229; the terminal 228 to which the power source voltage VDD is applied; the gate of the p-channel transistor 222; the one of the source and the drain of the p-channel transistor 222; the terminal 221 to which the power source voltage VDD is applied; the output terminal of the operational amplifier 224; the gate of the p-channel transistor 232; the one of the source and the drain of the p-channel transistor 232; and the terminal 231 to which the power source voltage VDD is applied. The other of the source and the drain of the p-channel transistor 229 is electrically connected to the inverting input terminal of the operational amplifier 224, the one of the terminals of the resistor 225, and the one of the terminals of the resistor 226. The gate of the p-channel transistor 229 is electrically connected to the following: the one of the source and the drain of the p-channel transistor 229; the terminal 228 to which the power source voltage VDD is applied; the gate of the p-channel transistor 222; the one of the source and the drain of the p-channel transistor 222; the terminal 221 to which the power source voltage VDD is applied; the output terminal of the operational amplifier 224; the gate of the p-channel transistor 232; the one of the source and the drain of the p-channel transistor 232; and the terminal 231 to which the power source voltage VDD is applied.

The one of the terminals of the resistor 225 is electrically connected to the inverting input terminal of the operational amplifier 224, the other of the source and the drain of the p-channel transistor 229, and one of the terminals of the resistor 226. The other of the terminals of the resistor 225 is electrically connected to the other of the terminals of the resistor 223, the output terminal of the diode 227, the other of the terminals of the resistor 233, and the output terminal of the diode 235; and the feedback voltage Vfb from the divider circuit 133 is input to the other of the terminals of the resistor 225, the other of the terminals of the resistor 223, the output terminal of the diode 227, the other of the terminals of the resistor 233, and the output terminal of the diode 235.

The one of the terminals of the resistor 226 is electrically connected to the other of the source and the drain of the p-channel transistor 229, the inverting input terminal of the operational amplifier 224, and the one of the terminals of the resistor 225. The other of the terminals of the resistor 226 is electrically connected to an input terminal of the diode 227.

The input terminal of the diode 227 is electrically connected to the other of the terminals of the resistor 226. The output terminal of the diode 227 is electrically connected to the other of the terminals of the resistor 223, the other of the terminals of the resistor 225, the other of the terminals of the resistor 233, and the output terminal of the diode 235; and the feedback voltage Vfb from the divider circuit 133 is input to the output terminal of the diode 227, the other of the terminals of the resistor 223, the other of the terminals of the resistor 225, the other of the terminals of the resistor 233, and the output terminal of the diode 235.

The one of the source and the drain of the p-channel transistor 232 is electrically connected to the following: the gate of the p-channel transistor 232; the terminal 231 to which the power source voltage VDD is applied; the gate of the p-channel transistor 222; the one of the source and the drain of the p-channel transistor 222; the terminal 221 to which the power source voltage VDD is applied; the output terminal of the operational amplifier 224; the gate of the p-channel transistor 229; the one of the source and the drain of the p-channel transistor 229; and the terminal 228 to which the power source voltage VDD is applied. The other of the source and the drain of the p-channel transistor 232 is electrically connected to the non-inverting input terminal of the operational amplifier 224, the one of the terminals of the resistor 233, and the one of the terminals of the resistor 234. The gate of the p-channel transistor 232 is electrically connected to the following: the one of the source and the drain of the p-channel transistor 232; the terminal 231 to which the power source voltage VDD is applied; the gate of the p-channel transistor 222; the one of the source and the drain of the p-channel transistor 222; the terminal 221 to which the power source voltage VDD is applied; the output terminal of the operational amplifier 224; the gate of the p-channel transistor 229; the one of the source and the drain of the p-channel transistor 229; and the terminal 228 to which the power source voltage VDD is applied.

The one of the terminals of the resistor 233 is electrically connected to the other of the source and the drain of the p-channel transistor 232, the non-inverting input terminal of the operational amplifier 224, and the one of the terminals of the resistor 234. The other of the terminals of the resistor 233 is electrically connected to the other of the terminals of the resistor 223, the other of the terminals of the resistor 225, the output terminal of the diode 227, and the output terminal of the diode 235; and the feedback voltage Vfb from the divider circuit 133 is input to the other of the terminals of the resistor 233, the other of the terminals of the resistor 223, the other of the terminals of the resistor 225, the output terminal of the diode 227, and the output terminal of the diode 235.

The one of the terminals of the resistor 234 is electrically connected to the other of the source and the drain of the p-channel transistor 232, the non-inverting input terminal of the operational amplifier 224, and the one of the terminals of the resistor 233. The other of the terminals of the resistor 234 is electrically connected to an input terminal of the diode 235.

The input terminal of the diode 235 is electrically connected to the other of the terminals of the resistor 234. The output terminal of the diode 235 is electrically connected to the other of the terminals of the resistor 223, the other of the terminals of the resistor 225, the output terminal of the diode 227, and the other of the terminals of the resistor 233; and the feedback voltage Vfb from the divider circuit 133 is input to the output terminal of the diode 235, the other of the terminals of the resistor 223, the other of the terminals of the resistor 225, the output terminal of the diode 227, and the other of the terminals of the resistor 233.

In the power supply circuit illustrated in FIG. 9, the reference voltage generation circuit 193 is a band gap reference including diodes (the diode 207 and the diode 215) which are elements utilizing band gap voltage and resistors (the resistor 203, the resistor 205, the resistor 206, the resistor 213, and the resistor 214). The reference voltage generation circuit 194 is a band gap reference including diodes (the diode 227 and the diode 235) which are elements utilizing band gap voltage and resistors (the resistor 223, the resistor 225, the resistor 226, the resistor 233, and the resistor 234). Therefore, an output voltage Vref of the reference voltage generation circuit 193 and an output voltage (Vref–Vfb) of the reference voltage generation circuit 194 do not vary by current; thus, high output stability can be obtained.

Since the reference voltage generation circuit 193 and the reference voltage generation circuit 194 are each a band gap reference, the output voltage Vref of the reference voltage generation circuit 193 and the output voltage (Vref–Vfb) of the reference voltage generation circuit 194 do not vary by the operation temperature; thus, high output stability can be obtained.

Note that the diode 207 and the diode 215 of the reference voltage generation circuit 193 and the diode 227 and the diode 235 of the reference voltage generation circuit 194 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

Figure 10:
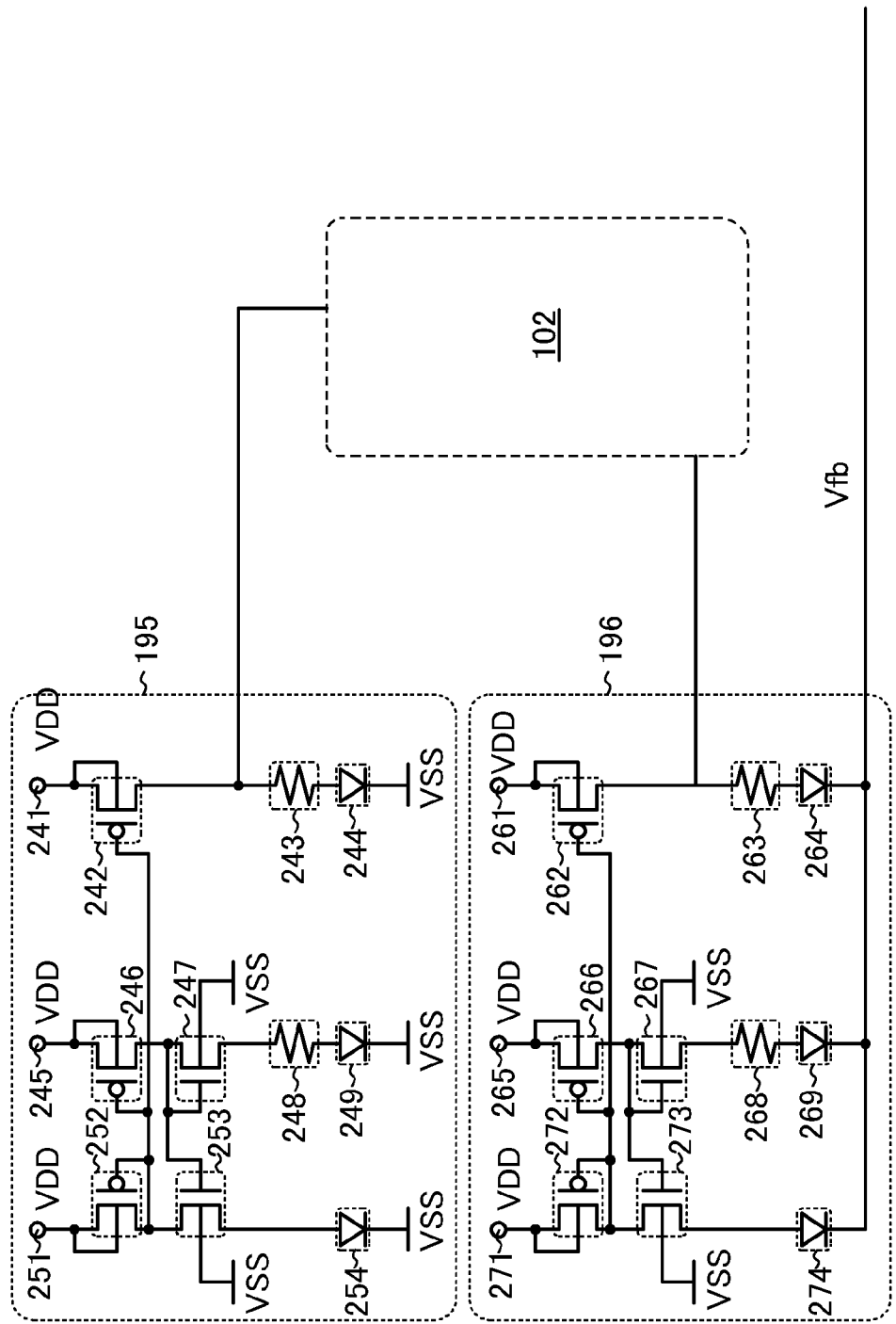
FIG. 10 is a circuit diagram of part of a power supply circuit.

A circuit configuration including a reference voltage generation circuit 195 and a reference voltage generation circuit 196 is illustrated in FIG. 10, which is different from the circuit configurations each including the reference voltage generation circuit 113 and the reference voltage generation circuit 114 illustrated in FIG. 2, FIG. 3, FIG. 4, FIG. 5, FIG. 6, and FIG. 7. Note that the reference voltage generation circuit 113 and the reference voltage generation circuit 114 illustrated in FIG. 2, FIG. 3, FIG. 4, FIG. 5, FIG. 6, and FIG. 7 can be replaced with the reference voltage generation circuit 195 and the reference voltage generation circuit 196, respectively.

The reference voltage generation circuit 195 which is a first reference voltage generation circuit includes a terminal 241, a p-channel transistor 242, a resistor 243, a diode 244, a terminal 245, a p-channel transistor 246, an n-channel transistor 247, a resistor 248, a diode 249, a terminal 251, a p-channel transistor 252, an n-channel transistor 253, and a diode 254.

One of a source and a drain of the p-channel transistor 242 is electrically connected to the following: the terminal 241 to which a power source voltage VDD is applied; a gate of the p-channel transistor 242; a gate of the p-channel transistor 246; one of a source and a drain of the p-channel transistor 246; the terminal 245 to which a power source voltage VDD is applied; a gate of the p-channel transistor 252; one of a source and a drain of the p-channel transistor 252; the terminal 251 to which a power source voltage VDD is applied, the other of the source and the drain of the p-channel transistor 252; and one of a source and a drain of the n-channel transistor 253. The other of the source and the drain of the p-channel transistor 242 is electrically connected to an input signal adjustment circuit 102 and one of terminals of the resistor 243. The gate of the p-channel transistor 242 is electrically connected to the following: the one of the source and the drain of the p-channel transistor 242; the terminal 241 to which the power source voltage VDD is applied; the gate of the p-channel transistor 246; the one of the source and the drain of the p-channel transistor 246; the terminal 245 to which the power source voltage VDD is applied; the gate of the p-channel transistor 252; the one of the source and the drain of the p-channel transistor 252; the terminal 251 to which the power source voltage VDD is applied, the other of the source and the drain of the p-channel transistor 252, and the one of the source and the drain of the n-channel transistor 253.

The one of the terminals of the resistor 243 is electrically connected to the other of the source and the drain of the p-channel transistor 242 and the input signal adjustment circuit 102. The other of the terminals of the resistor 243 is electrically connected to an input terminal of the diode 244.

The input terminal of the diode 244 is electrically connected to the other of the terminals of the resistor 243. A power source voltage VSS (e.g., a ground voltage GND) which is lower than the power source voltage VDD is applied to an output terminal of the diode 244.

The one of the source and the drain of the p-channel transistor 246 is electrically connected to the following: the terminal 245 to which the power source voltage VDD is applied; the gate of the p-channel transistor 246; the gate of the p-channel transistor 242; the one of the source and the drain of the p-channel transistor 242; the terminal 241 to which the power source voltage VDD is applied; the gate of the p-channel transistor 252; the one of the source and the drain of the p-channel transistor 252; the terminal 251 to which the power source voltage VDD is applied; the other of the source and the drain of the p-channel transistor 252; and the one of the source and the drain of the n-channel transistor 253. The other of the source and the drain of the p-channel transistor 246 is electrically connected to one of a source and a drain of the n-channel transistor 247, a gate of the n-channel transistor 247, and a gate of the n-channel transistor 253; and a power source voltage VSS (e.g., a ground voltage GND) which is lower than the power source voltage VDD is applied to the other of the source and the drain of the p-channel transistor 246, the one of the source and the drain of the n-channel transistor 247, the gate of the n-channel transistor 247, and the gate of the n-channel transistor 253. The gate of the p-channel transistor 246 is electrically connected to the following: the one of the source and the drain of the p-channel transistor 246; the terminal 245 to which the power source voltage VDD is applied; the gate of the p-channel transistor 242; the one of the source and the drain of the p-channel transistor 242; the terminal 241 to which the power source voltage VDD is applied; the gate of the p-channel transistor 252; the one of the source and the drain of the p-channel transistor 252; the terminal 251 to which the power source voltage VDD is applied; the other of the source and the drain of the p-channel transistor 252; and the one of the source and the drain of the n-channel transistor 253.

The one of the source and the drain of the n-channel transistor 247 is electrically connected to the gate of the n-channel transistor 247, the other of the source and the drain of the p-channel transistor 246, and the gate of the n-channel transistor 253; and a power source voltage VSS (e.g., a ground voltage GND) which is lower than the power source voltage VDD is applied to the one of the source and the drain of the n-channel transistor 247, the gate of the n-channel transistor 247, the other of the source and the drain of the p-channel transistor 246, and the gate of the n-channel transistor 253. The other of the source and the drain of the n-channel transistor 247 is electrically connected to one of terminals of the resistor 248. The gate of the n-channel transistor 247 is electrically connected to the one of the source and the drain of the n-channel transistor 247, the other of the source and the drain of the p-channel transistor 246, and the gate of the n-channel transistor 253; and the power source voltage VSS (e.g., a ground voltage GND) which is lower than the power source voltage VDD is applied to the gate of the n-channel transistor 247, the one of the source and the drain of the n-channel transistor 247, the other of the source and the drain of the p-channel transistor 246, and the gate of the n-channel transistor 253.

The one of the terminals of the resistor 248 is electrically connected to the other of the source and the drain of the n-channel transistor 247. The other of the terminals of the resistor 248 is electrically connected to an input terminal of the diode 249.

The input terminal of the diode 249 is electrically connected to the other of the terminals of the resistor 248. A power source voltage VSS (e.g., a ground voltage GND) which is lower than the power source voltage VDD is applied to an output terminal of the diode 249.

The one of the source and the drain of the p-channel transistor 252 is electrically connected to the following: the gate of the p-channel transistor 252; the terminal 251 to which the power source voltage VDD is applied; the other of the source and the drain of the p-channel transistor 252; the gate of the p-channel transistor 242; the one of the source and the drain of the p-channel transistor 242; the terminal 241 to which the power source voltage VDD is applied; the one of the source and the drain of the p-channel transistor 246; the terminal 245 to which the power source voltage VDD is applied; the gate of the p-channel transistor 246; and the one of the source and the drain of the n-channel transistor 253. The other of the source and the drain of the p-channel transistor 252 is electrically connected to the following: the one of the source and the drain of the p-channel transistor 252; the gate of the p-channel transistor 252; the terminal 251 to which the power source voltage VDD is applied; the gate of the p-channel transistor 242; the one of the source and the drain of the p-channel transistor 242; the terminal 241 to which the power source voltage VDD is applied; the one of the source and the drain of the p-channel transistor 246; the terminal 245 to which the power source voltage VDD is applied; the gate of the p-channel transistor 246; and the one of the source and the drain of the n-channel transistor 253.

The one of the source and the drain of the n-channel transistor 253 is electrically connected to the following: the gate of the p-channel transistor 242; the one of the source and the drain of the p-channel transistor 242; the terminal 241 to which a power source voltage VDD is applied; the one of the source and the drain of the p-channel transistor 246; the terminal 245 to which the power source voltage VDD is applied; the gate of the p-channel transistor 246; the gate of the p-channel transistor 252; the one of the source and the drain of the p-channel transistor 252; the terminal 251 to which the power source voltage VDD is applied; and the other of the source and the drain of the p-channel transistor 252. The other of the source and the drain of the n-channel transistor 253 is electrically connected to an input terminal of the diode 254. The gate of the n-channel transistor 253 is electrically connected to the one of the source and the drain of the n-channel transistor 247, the gate of the n-channel transistor 247, and the other of the source and the drain of the p-channel transistor 246; and the power source voltage VSS (e.g., a ground voltage GND) which is lower than the power source voltage VDD is applied to the gate of the n-channel transistor 253, the one of the source and the drain of the n-channel transistor 247, the gate of the n-channel transistor 247, and the other of the source and the drain of the p-channel transistor 246.

The input terminal of the diode 254 is electrically connected to the other of the source and the drain of the n-channel transistor 253. A power source voltage VSS (e.g., a ground voltage GND) which is lower than the power source voltage VDD is applied to an output terminal of the diode 254.

The reference voltage generation circuit 196 which is the second reference voltage generation circuit includes a terminal 261, a p-channel transistor 262, a resistor 263, a diode 264, a terminal 265, a p-channel transistor 266, an n-channel transistor 267, a resistor 268, a diode 269, a terminal 271, a p-channel transistor 272, an n-channel transistor 273, and a diode 274.

One of a source and a drain of the p-channel transistor 262 is electrically connected to the following: the terminal 261 to which a power source voltage VDD is applied; a gate of the p-channel transistor 262; a gate of the p-channel transistor 266; one of a source and a drain of the p-channel transistor 266; the terminal 265 to which a power source voltage VDD is applied; a gate of the p-channel transistor 272; one of a source and a drain of the p-channel transistor 272; the terminal 271 to which a power source voltage VDD is applied, the other of the source and the drain of the p-channel transistor 272; and one of a source and a drain of the n-channel transistor 273. The other of the source and the drain of the p-channel transistor 262 is electrically connected to the input signal adjustment circuit 102 and one of terminals of the resistor 263. The gate of the p-channel transistor 262 is electrically connected to the following: the one of the source and the drain of the p-channel transistor 262; the terminal 261 to which the power source voltage VDD is applied; the gate of the p-channel transistor 266; the one of the source and the drain of the p-channel transistor 266; the terminal 265 to which the power source voltage VDD is applied; the gate of the p-channel transistor 272; the one of the source and the drain of the p-channel transistor 272; the terminal 271 to which the power source voltage VDD is applied; the other of the source and the drain of the p-channel transistor 272; and the one of the source and the drain of the n-channel transistor 273.

The one of the terminals of the resistor 263 is electrically connected to the other of the source and the drain of the p-channel transistor 262 and the input signal adjustment circuit 102. The other of the terminals of the resistor 263 is electrically connected to an input terminal of the diode 264.

The input terminal of the diode 264 is electrically connected to the other of the terminals of the resistor 263. An output terminal of the diode 264 is electrically connected to an output terminal of the diode 269 and an output terminal of the diode 274; and a feedback voltage Vfb from a divider circuit 133 is input to the output terminal of the diode 264, the output terminal of the diode 269, and the output terminal of the diode 274.

The one of the source and the drain of the p-channel transistor 266 is electrically connected to the following: the terminal 265 to which the power source voltage VDD is applied; the gate of the p-channel transistor 266; the gate of the p-channel transistor 262; the one of the source and the drain of the p-channel transistor 262; the terminal 261 to which the power source voltage VDD is applied; the gate of the p-channel transistor 272; the one of the source and the drain of the p-channel transistor 272; the terminal 271 to which the power source voltage VDD is applied; the other of the source and the drain of the p-channel transistor 272; and the one of the source and the drain of the n-channel transistor 273. The other of the source and the drain of the p-channel transistor 266 is electrically connected to one of a source and a drain of the n-channel transistor 267, a gate of the n-channel transistor 267, and a gate of the n-channel transistor 273; and a power source voltage VSS (e.g., a ground voltage GND) which is lower than the power source voltage VDD is applied to the other of the source and the drain of the p-channel transistor 266, the one of the source and the drain of the n-channel transistor 267, the gate of the n-channel transistor 267, and the gate of the n-channel transistor 273. The gate of the p-channel transistor 266 is electrically connected to the following: the one of the source and the drain of the p-channel transistor 266; the terminal 265 to which the power source voltage VDD is applied; the gate of the p-channel transistor 262; the one of the source and the drain of the p-channel transistor 262; the terminal 261 to which the power source voltage VDD is applied; the gate of the p-channel transistor 272; the one of the source and the drain of the p-channel transistor 272; the terminal 271 to which the power source voltage VDD is applied; the other of the source and the drain of the p-channel transistor 272; and the one of the source and the drain of the n-channel transistor 273.

The one of the source and the drain of the n-channel transistor 267 is electrically connected to the gate of the n-channel transistor 267, the other of the source and the drain of the p-channel transistor 266, and the gate of the n-channel transistor 273; and the power source voltage VSS (e.g., a ground voltage GND) which is lower than the power source voltage VDD is applied to the one of the source and the drain of the n-channel transistor 267, the gate of the n-channel transistor 267, the other of the source and the drain of the p-channel transistor 266, and the gate of the n-channel transistor 273.

The other of the source and the drain of the n-channel transistor 267 is electrically connected to one of terminals of the resistor 268. The gate of the n-channel transistor 267 is electrically connected to the one of the source and the drain of the n-channel transistor 267, the other of the source and the drain of the p-channel transistor 266, and the gate of the n-channel transistor 273; and the power source voltage VSS (e.g., a ground voltage GND) which is lower than the power source voltage VDD is applied to the gate of the n-channel transistor 267, the one of the source and the drain of the n-channel transistor 267, the other of the source and the drain of the p-channel transistor 266, and the gate of the n-channel transistor 273.

The one of the terminals of the resistor 268 is electrically connected to the other of the source and the drain of the n-channel transistor 267. The other of the terminals of the resistor 268 is electrically connected to an input terminal of the diode 269.

The input terminal of the diode 269 is electrically connected to the other of the terminals of the resistor 268. The output terminal of the diode 269 is electrically connected to the output terminal of the diode 264 and the output terminal of the diode 274; and the feedback voltage Vfb from the divider circuit 133 is input to the output terminal of the diode 269, the output terminal of the diode 264, and the output terminal of the diode 274.

The one of the source and the drain of the p-channel transistor 272 is electrically connected to the following: the gate of the p-channel transistor 272; the terminal 271 to which the power source voltage VDD is applied; the other of the source and the drain of the p-channel transistor 272; the gate of the p-channel transistor 262; the one of the source and the drain of the p-channel transistor 262; the terminal 261 to which the power source voltage VDD is applied; the gate of the p-channel transistor 266; the one of the source and the drain of the p-channel transistor 266; the terminal 265 to which the power source voltage VDD is applied; and the one of the source and the drain of the n-channel transistor 273. The other of the source and the drain of the p-channel transistor 272 is electrically connected to the following: the one of the source and the drain of the p-channel transistor 272; the gate of the p-channel transistor 272; the terminal 271 to which the power source voltage VDD is applied; the gate of the p-channel transistor 262; the terminal 261 to which the power source voltage VDD is applied; the one of the source and the drain of the p-channel transistor 262; the one of the source and the drain of the p-channel transistor 266; the terminal 265 to which the power source voltage VDD is applied; the gate of the p-channel transistor 266; and the one of the source and the drain of the n-channel transistor 273.

The one of the source and the drain of the n-channel transistor 273 is electrically connected to the following: the gate of the p-channel transistor 262; the one of the source and the drain of the p-channel transistor 262; the terminal 261 to which a power source voltage VDD is applied; the gate of the p-channel transistor 266; the one of the source and the drain of the p-channel transistor 266; the terminal 265 to which the power source voltage VDD is applied; the gate of the p-channel transistor 272; the one of the source and the drain of the p-channel transistor 272; the terminal 271 to which the power source voltage VDD is applied; and the other of the source and the drain of the p-channel transistor 272. The other of the source and the drain of the n-channel transistor 273 is electrically connected to an input terminal of the diode 274. The gate of the n-channel transistor 273 is electrically connected to the one of the source and the drain of the n-channel transistor 267, the gate of the n-channel transistor 267, and the other of the source and the drain of the p-channel transistor 266; and a power source voltage VSS (e.g., a ground voltage GND) which is lower than the power source voltage VDD is applied to the gate of the n-channel transistor 273, the one of the source and the drain of the n-channel transistor 267, the gate of the n-channel transistor 267, and the other of the source and the drain of the p-channel transistor 266.

The input terminal of the diode 274 is electrically connected to the other of the source and the drain of the n-channel transistor 273. The output terminal of the diode 274 is electrically connected to the output terminal of the diode 264 and the output terminal of the diode 269; and the feedback voltage Vfb from the divider circuit 133 is input to the output terminal of the diode 274, the output terminal of the diode 264, and the output terminal of the diode 269.

In the power supply circuit illustrated in FIG. 10, the reference voltage generation circuit 195 is a band gap reference including diodes (the diode 244, the diode 249, and the diode 254) which are elements utilizing band gap voltage and resistors (the resistor 243 and the resistor 248). The reference voltage generation circuit 196 is a band gap reference including diodes (the diode 264, the diode 269, and the diode 274) which are elements utilizing band gap voltage and resistors (the resistor 263 and the resistor 268). Therefore, an output voltage Vref of the reference voltage generation circuit 195 and an output voltage (Vref−Vfb) of the reference voltage generation circuit 196 do not vary by current; thus, high output stability can be obtained.

Since the reference voltage generation circuit 195 and the reference voltage generation circuit 196 are each a band gap reference, the output voltage Vref of the reference voltage generation circuit 195 and the output voltage (Vref−Vfb) of the reference voltage generation circuit 196 do not vary by the operation temperature; thus, high output stability can be obtained.

Note that the diode 244, the diode 249, and the diode 254 of the reference voltage generation circuit 195 and the diode 264, the diode 269, and the diode 274 of the reference voltage generation circuit 196 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

A circuit configuration including a reference voltage generation circuit 197 and a reference voltage generation circuit 198 is illustrated in FIG. 11, which is different from the circuit configurations each including the reference voltage generation circuit 113 and the reference voltage generation circuit 114 illustrated in FIG. 2, FIG. 3, FIG. 4, FIG. 5, FIG. 6, and FIG. 7. Note that the reference voltage generation circuit 113 and the reference voltage generation circuit 114 illustrated in FIG. 2, FIG. 3, FIG. 4, FIG. 5, FIG. 6, and FIG. 7 can be replaced with the reference voltage generation circuit 197 and the reference voltage generation circuit 198, respectively.

The reference voltage generation circuit 197 which is a first reference voltage generation circuit includes a terminal 301, a p-channel transistor 302, a resistor 303, a terminal 304, a p-channel transistor 305, an n-channel transistor 306, a resistor 307, a resistor 308, a diode 309, a terminal 311, a p-channel transistor 312, an n-channel transistor 313, a diode 314, and a resistor 315.

One of a source and a drain of the p-channel transistor 302 is electrically connected to the following: the terminal 301 to which a power source voltage VDD is applied; a gate of the p-channel transistor 302; a gate of the p-channel transistor 305; one of a source and a drain of the p-channel transistor 305; the terminal 304 to which a power source voltage VDD is applied; a gate of the p-channel transistor 312; one of a source and a drain of the p-channel transistor 312; the terminal 311 to which a power source voltage VDD is applied, the other of the source and the drain of the p-channel transistor 312; and one of a source and a drain of the n-channel transistor 313. The other of the source and the drain of the p-channel transistor 302 is electrically connected to an input signal adjustment circuit 102 and one of terminals of the resistor 303. The gate of the p-channel transistor 302 is electrically connected to the following: the one of the source and the drain of the p-channel transistor 302; the terminal 301 to which the power source voltage VDD is applied; the gate of the p-channel transistor 305; the one of the source and the drain of the p-channel transistor 305; the terminal 304 to which the power source voltage VDD is applied; the gate of the p-channel transistor 312; the one of the source and the drain of the p-channel transistor 312; the terminal 311 to which the power source voltage VDD is applied; the other of the source and the drain of the p-channel transistor 312; and the one of the source and the drain of the n-channel transistor 313.

The one of the terminals of the resistor 303 is electrically connected to the other of the source and the drain of the p-channel transistor 302 and the input signal adjustment circuit 102. A power source voltage VSS (e.g., a ground voltage GND) which is lower than the power source voltage VDD is applied to the other of the terminals of the resistor 303.

The one of the source and the drain of the p-channel transistor 305 is electrically connected to the following: the gate of the p-channel transistor 305; the terminal 304 to which the power source voltage VDD is applied; the gate of the p-channel transistor 302; the one of the source and the drain of the p-channel transistor 302; the terminal 301 to which the power source voltage VDD is applied; the gate of the p-channel transistor 312; the one of the source and the drain of the p-channel transistor 312; the terminal 311 to which the power source voltage VDD is applied; the other of the source and the drain of the p-channel transistor 312; and the one of the source and the drain of the n-channel transistor 313. The other of the source and the drain of the p-channel transistor 305 is electrically connected to one of a source and a drain of the n-channel transistor 306, a gate of the n-channel transistor 306, and a gate of the n-channel transistor 313; and a power source voltage VSS (e.g., a ground voltage GND) which is lower than the power source voltage VDD is applied to the other of the source and the drain of the p-channel transistor 305, the one of the source and the drain of the n-channel transistor 306, the gate of the n-channel transistor 306, and the gate of the n-channel transistor 313. The gate of the p-channel transistor 305 is electrically connected to the following: the one of the source and the drain of the p-channel transistor 305; the terminal 304 to which the power source voltage VDD is applied; the gate of the p-channel transistor 302; the one of the source and the drain of the p-channel transistor 302; the terminal 301 to which the power source voltage VDD is applied; the gate of the p-channel transistor 312; the one of the source and the drain of the p-channel transistor 312; the terminal 311 to which the power source voltage VDD is applied; the other of the source and the drain of the p-channel transistor 312; and the one of the source and the drain of the n-channel transistor 313.

The one of the source and the drain of the n-channel transistor 306 is electrically connected to the gate of the n-channel transistor 306, the other of the source and the drain of the p-channel transistor 305, and the gate of the n-channel transistor 313; and a power source voltage VSS (e.g., a ground voltage GND) which is lower than the power source voltage VDD is applied to the one of the source and the drain of the n-channel transistor 306, the gate of the n-channel transistor 306, the other of the source and the drain of the p-channel transistor 305, and the gate of the n-channel transistor 313. The other of the source and the drain of the n-channel transistor 306 is electrically connected to one of terminals of the resistor 307 and one of terminals of the resistor 308. The gate of the n-channel transistor 306 is electrically connected to the one of the source and the drain of the n-channel transistor 306, the other of the source and the drain of the p-channel transistor 305, and the gate of the n-channel transistor 313; and the power source voltage VSS (e.g., a ground voltage GND) which is lower than the power source voltage VDD is applied to the gate of the n-channel transistor 306, the one of the source and the drain of the n-channel transistor 306, the other of the source and the drain of the p-channel transistor 305, and the gate of the n-channel transistor 313.

The one of the terminals of the resistor 307 is electrically connected to the other of the source and the drain of the n-channel transistor 306 and the one of the terminals of the resistor 308. A power source voltage VSS (e.g., a ground voltage GND) which is lower than the power source voltage VDD is applied to the other of the terminals of the resistor 307.

The one of the terminals of the resistor 308 is electrically connected to the other of the source and the drain of the n-channel transistor 306 and the one of the terminals of the resistor 307. The other of the terminals of the resistor 308 is electrically connected to an input terminal of the diode 309.

The input terminal of the diode 309 is electrically connected to the other of the terminals of the resistor 308. A power source voltage VSS (e.g., a ground voltage GND) which is lower than the power source voltage VDD is applied to an output terminal of the diode 309.

The one of the source and the drain of the p-channel transistor 312 is electrically connected to the following: the gate of the p-channel transistor 312; the terminal 311 to which the power source voltage VDD is applied; the other of the source and the drain of the p-channel transistor 312; the gate of the p-channel transistor 302; the one of the source and the drain of the p-channel transistor 302; the terminal 301 to which the power source voltage VDD is applied; the gate of the p-channel transistor 305; the one of the source and the drain of the p-channel transistor 305; the terminal 304 to which the power source voltage VDD is applied; and the one of the source and the drain of the n-channel transistor 313. The other of the source and the drain of the p-channel transistor 312 is electrically connected to the following: the one of the source and the drain of the p-channel transistor 312; the gate of the p-channel transistor 312; the terminal 311 to which the power source voltage VDD is applied; the gate of the p-channel transistor 302; the one of the source and the drain of the p-channel transistor 302; the terminal 301 to which the power source voltage VDD is applied; the one of the source and the drain of the p-channel transistor 305; the gate of the p-channel transistor 305; the terminal 304 to which the power source voltage VDD is applied; and the one of the source and the drain of the n-channel transistor 313. The gate of the p-channel transistor 312 is electrically connected to the following: the other of the source and the drain of the p-channel transistor 312; the one of the source and the drain of the p-channel transistor 312; the terminal 311 to which the power source voltage VDD is applied; the gate of the p-channel transistor 302; the one of the source and the drain of the p-channel transistor 302; the terminal 301 to which the power source voltage VDD is applied; the gate of the p-channel transistor 305; the one of the source and the drain of the p-channel transistor 305; the terminal 304 to which the power source voltage VDD is applied; and the one of the source and the drain of the n-channel transistor 313.

The one of the source and the drain of the n-channel transistor 313 is electrically connected to the following: the gate of the p-channel transistor 302; the one of the source and the drain of the p-channel transistor 302; the terminal 301 to which the power source voltage VDD is applied; the gate of the p-channel transistor 305; the one of the source and the drain of the p-channel transistor 305; the terminal 304 to which the power source voltage VDD is applied; the other of the source and the drain of the p-channel transistor 312; the gate of the p-channel transistor 312; the one of the source and the drain of the p-channel transistor 312; and the terminal 311 to which the power source voltage VDD is applied. The other of the source and the drain of the n-channel transistor 313 is electrically connected to an input terminal of the diode 314 and one of terminals of the resistor 315. The gate of the n-channel transistor 313 is electrically connected to the one of the source and the drain of the n-channel transistor 306, the gate of the n-channel transistor 306, and the other of the source and the drain of the p-channel transistor 305; and the power source voltage VSS (e.g., a ground voltage GND) which is lower than the power source voltage VDD is applied to the gate of the n-channel transistor 313, the one of the source and the drain of the n-channel transistor 306, the gate of the n-channel transistor 306, and the other of the source and the drain of the p-channel transistor 305.

The input terminal of the diode 314 is electrically connected to the other of the source and the drain of the n-channel transistor 313 and the one of the terminals of the resistor 315. A power source voltage VSS (e.g., a ground voltage GND) which is lower than the power source voltage VDD is applied to an output terminal of the diode 314.

The one of the terminals of the resistor 315 is electrically connected to the input terminal of the diode 314 and the other of the source and the drain of the n-channel transistor 313. A power source voltage VSS (e.g., a ground voltage GND) which is lower than the power source voltage VDD is applied to the other of the terminals of the resistor 315.

The reference voltage generation circuit 198 which is a second reference voltage generation circuit includes a terminal 321, a p-channel transistor 322, a resistor 323, a terminal 324, a p-channel transistor 325, an n-channel transistor 326, a resistor 327, a resistor 328, a diode 329, a terminal 331, a p-channel transistor 332, an n-channel transistor 333, a diode 334, and a resistor 335.

One of a source and a drain of the p-channel transistor 322 is electrically connected to the following: the terminal 321 to which a power source voltage VDD is applied; a gate of the p-channel transistor 322; a gate of the p-channel transistor 325; one of a source and a drain of the p-channel transistor 325; the terminal 324 to which a power source voltage VDD is applied; a gate of the p-channel transistor 332; one of a source and a drain of the p-channel transistor 332; the terminal 331 to which a power source voltage VDD is applied, the other of the source and the drain of the p-channel transistor 332; and one of a source and a drain of the n-channel transistor 333. The other of the source and the drain of the p-channel transistor 322 is electrically connected to the input signal adjustment circuit 102 and one of terminals of the resistor 323. The gate of the p-channel transistor 322 is electrically connected to the following: the one of the source and the drain of the p-channel transistor 322; the terminal 321 to which the power source voltage VDD is applied; the gate of the p-channel transistor 325; the one of the source and the drain of the p-channel transistor 325; the terminal 324 to which the power source voltage VDD is applied; the gate of the p-channel transistor 332; the one of the source and the drain of the p-channel transistor 332; the terminal 331 to which the power source voltage VDD is applied, the other of the source and the drain of the p-channel transistor 332; and the one of the source and the drain of the n-channel transistor 333.

The one of the terminals of the resistor 323 is electrically connected to the other of the source and the drain of the p-channel transistor 322 and the input signal adjustment circuit 102. The other of the terminals of the resistor 323 is electrically connected to the other of terminals of the resistor 327, an output terminal of the diode 329, an output terminal of the diode 334, and the other of terminals of the resistor 335; and a feedback voltage Vfb from a divider circuit 133 is input to the other of the terminals of the resistor 323, the other of terminals of the resistor 327, the output terminal of the diode 329, the output terminal of the diode 334, and the other of terminals of the resistor 335.

The one of the source and the drain of the p-channel transistor 325 is electrically connected to the following: the gate of the p-channel transistor 325; the terminal 324 to which the power source voltage VDD is applied; the gate of the p-channel transistor 322; the one of the source and the drain of the p-channel transistor 322; the terminal 321 to which the power source voltage VDD is applied; the gate of the p-channel transistor 332; the one of the source and the drain of the p-channel transistor 332; the terminal 331 to which the power source voltage VDD is applied; the other of the source and the drain of the p-channel transistor 332; and the one of the source and the drain of the n-channel transistor 333. The other of the source and the drain of the p-channel transistor 325 is electrically connected to one of a source and a drain of the n-channel transistor 326, a gate of the n-channel transistor 326, and a gate of the n-channel transistor 333; and a power source voltage VSS (e.g., a ground voltage GND) which is lower than the power source voltage VDD is applied to the other of the source and the drain of the p-channel transistor 325, the one of the source and the drain of the n-channel transistor 326, the gate of the n-channel transistor 326, and the gate of the n-channel transistor 333. The gate of the p-channel transistor 325 is electrically connected to the following: the one of the source and the drain of the p-channel transistor 325; the terminal 324 to which the power source voltage VDD is applied; the gate of the p-channel transistor 322; the one of the source and the drain of the p-channel transistor 322; the terminal 321 to which the power source voltage VDD is applied; the gate of the p-channel transistor 332; the one of the source and the drain of the p-channel transistor 332; the terminal 331 to which the power source voltage VDD is applied; the other of the source and the drain of the p-channel transistor 332; and the one of the source and the drain of the n-channel transistor 333.

The one of the source and the drain of the n-channel transistor 326 is electrically connected to the gate of the n-channel transistor 326, the other of the source and the drain of the p-channel transistor 325, and the gate of the n-channel transistor 333; and the power source voltage VSS (e.g., a ground voltage GND) which is lower than the power source voltage VDD is applied to the one of the source and the drain of the n-channel transistor 326, the gate of the n-channel transistor 326, the other of the source and the drain of the p-channel transistor 325, and the gate of the n-channel transistor 333. The other of the source and the drain of the n-channel transistor 326 is electrically connected to one of the terminals of the resistor 327 and one of terminals of the resistor 328. The gate of the n-channel transistor 326 is electrically connected to the one of the source and the drain of the n-channel transistor 326, the other of the source and the drain of the p-channel transistor 325, and the gate of the n-channel transistor 333; and a power source voltage VSS (e.g., a ground voltage GND) which is lower than the power source voltage VDD is applied to the gate of the n-channel transistor 326, the one of the source and the drain of the n-channel transistor 326, the other of the source and the drain of the p-channel transistor 325, and the gate of the n-channel transistor 333.

The one of the terminals of the resistor 327 is electrically connected to the other of the source and the drain of the n-channel transistor 326 and the one of the terminals of the resistor 328. The other of the terminals of the resistor 327 is electrically connected to the other of the terminals of the resistor 323, the output terminal of the diode 329, the output terminal of the diode 334, and the other of the terminals of the resistor 335; and the feedback voltage Vfb from the divider circuit 133 is input to the other of the terminals of the resistor 327, the other of the terminals of the resistor 323, the output terminal of the diode 329, the output terminal of the diode 334, and the other of the terminals of the resistor 335.

The one of the terminals of the resistor 328 is electrically connected to the other of the source and the drain of the n-channel transistor 326 and the one of the terminals of the resistor 327. The other of the terminals of the resistor 328 is electrically connected to an input terminal of the diode 329.

The input terminal of the diode 329 is electrically connected to the other of the terminals of the resistor 328. The output terminal of the diode 329 is electrically connected to the other of the terminals of the resistor 323, the other of the terminals of the resistor 327, the output terminal of the diode 334, and the other of the terminals of the resistor 335; and the feedback voltage Vfb from the divider circuit 133 is input to the output terminal of the diode 329, the other of the terminals of the resistor 323, the other of the terminals of the resistor 327, the output terminal of the diode 334, and the other of the terminals of the resistor 335.

The one of the source and the drain of the p-channel transistor 332 is electrically connected to the following: the gate of the p-channel transistor 332; the terminal 331 to which the power source voltage VDD is applied; the gate of the p-channel transistor 322; the other of the source and the drain of the p-channel transistor 332; the one of the source and the drain of the p-channel transistor 322; the terminal 321 to which the power source voltage VDD is applied; the gate of the p-channel transistor 325; the one of the source and the drain of the p-channel transistor 325; the terminal 324 to which the power source voltage VDD is applied, and the one of the source and the drain of the n-channel transistor 333. The other of the source and the drain of the p-channel transistor 332 is electrically connected to the following: the one of the source and the drain of the p-channel transistor 332; the gate of the p-channel transistor 332; the terminal 331 to which the power source voltage VDD is applied; the gate of the p-channel transistor 322; the one of the source and the drain of the p-channel transistor 322; the terminal 321 to which the power source voltage VDD is applied; the gate of the p-channel transistor 325; the one of the source and the drain of the p-channel transistor 325; the terminal 324 to which the power source voltage VDD is applied; and the one of the source and the drain of the n-channel transistor 333. The gate of the p-channel transistor 332 is electrically connected to the following: the other of the source and the drain of the p-channel transistor 332; the one of the source and the drain of the p-channel transistor 332; the terminal 331 to which the power source voltage VDD is applied; the gate of the p-channel transistor 322; the one of the source and the drain of the p-channel transistor 322; the terminal 321 to which the power source voltage VDD is applied; the gate of the p-channel transistor 325; the one of the source and the drain of the p-channel transistor 325; the terminal 324 to which the power source voltage VDD is applied; and the one of the source and the drain of the n-channel transistor 333.

The one of the source and the drain of the n-channel transistor 333 is electrically connected to the following: the gate of the p-channel transistor 322; the one of the source and the drain of the p-channel transistor 322; the terminal 321 to which the power source voltage VDD is applied; the gate of the p-channel transistor 325; the one of the source and the drain of the p-channel transistor 325; the terminal 324 to which the power source voltage VDD is applied; the gate of the p-channel transistor 332; the one of the source and the drain of the p-channel transistor 332; the terminal 331 to which the power source voltage VDD is applied; and the other of the source and the drain of the p-channel transistor 332. The other of the source and the drain of the n-channel transistor 333 is electrically connected to an input terminal of the diode 334 and one of the terminals of the resistor 335. The gate of the n-channel transistor 333 is electrically connected to the one of the source and the drain of the n-channel transistor 326, the gate of the n-channel transistor 326, and the other of the source and the drain of the p-channel transistor 325; and the power source voltage VSS (e.g., a ground voltage GND) which is lower than the power source voltage VDD is applied to the gate of the n-channel transistor 333, the one of the source and the drain of the n-channel transistor 326, the gate of the n-channel transistor 326, and the other of the source and the drain of the p-channel transistor 325.

The input terminal of the diode 334 is electrically connected to the other of the source and the drain of the n-channel transistor 333 and the one of the terminals of the resistor 335. The output terminal of the diode 334 is electrically connected to the other of the terminals of the resistor 323, the other of the terminals of the resistor 327, the output terminal of the diode 329, and the other of the terminals of the resistor 335; and the feedback voltage Vfb from the divider circuit 133 is input to the output terminal of the diode 334, the other of the terminals of the resistor 323, the other of the terminals of the resistor 327, the output terminal of the diode 329, and the other of the terminals of the resistor 335.

The one of the terminals of the resistor 335 is electrically connected to the input terminal of the diode 334 and the other of the source and the drain of the n-channel transistor 333. The other of the terminals of the resistor 335 is electrically connected to the other of the terminals of the resistor 323, the other of the terminals of the resistor 327, the output terminal of the diode 329, and the output terminal of the diode 334; and the feedback voltage Vfb from the divider circuit 133 is input to the other of the terminals of the resistor 335, the other of the terminals of the resistor 323, the other of the terminals of the resistor 327, the output terminal of the diode 329, and the output terminal of the diode 334.

In the power supply circuit illustrated in FIG. 11, the reference voltage generation circuit 197 is a band gap reference including diodes (the diode 309 and the diode 314) which are elements utilizing band gap voltage and resistors (the resistor 303, the resistor 307, the resistor 308, and the resistor 315). The reference voltage generation circuit 198 is a band gap reference including diodes (the diode 329 and the diode 334) which are elements utilizing band gap voltage and resistors (the resistor 323, the resistor 327, the resistor 328, and the resistor 335). Therefore, an output voltage Vref of the reference voltage generation circuit 197 and an output voltage (Vref−Vfb) of the reference voltage generation circuit 198 do not vary by current; thus, high output stability can be obtained.

Since the reference voltage generation circuit 197 and the reference voltage generation circuit 198 are each a band gap reference, the output voltage Vref of the reference voltage generation circuit 197 and the output voltage (Vref−Vfb) of the reference voltage generation circuit 198 do not vary by the operation temperature; thus, high output stability can be obtained.

Note that the diode 309 and the diode 314 of the reference voltage generation circuit 197 and the diode 329 and the diode 334 of the reference voltage generation circuit 198 can each be replaced with a PNP bipolar transistor in which a base and a collector are electrically connected to each other. The PNP bipolar transistor is also an element utilizing band gap voltage. Therefore, the output voltage of the reference voltage generation circuit in which the diode is replaced with the PNP bipolar transistor does not vary by current; thus, an advantageous effect of high output stability can be obtained.

Further, the output voltage of the reference voltage generation circuit in which the diode is replaced with the PNP bipolar transistor does not vary by the operation temperature; thus, an advantageous effect of high output stability can be obtained.

As described above, according to this embodiment, a detection circuit for detecting feedback voltage without variation in output voltage/current can be obtained.

Further, according to this embodiment, a detection circuit for detecting feedback voltage without variation in output voltage by the operation temperature can be obtained.

Furthermore, according to this embodiment, a power supply circuit including the above detection circuit can be obtained.

This application is based on Japanese Patent Application serial No. 2010-197283 filed with the Japan Patent Office on Sep. 3, 2010, the entire contents of which are hereby incorporated by reference.

What is claimed is:

1. A power supply circuit comprising:
a control circuit comprising:
   a detection circuit including a first reference voltage generation circuit, a second reference voltage generation circuit, and an input signal adjustment circuit;
   an error amplifier circuit;
   a pulse width modulation driver;
   a triangle-wave generation circuit; and
   a capacitor,
an amplifier circuit electrically connected to the control circuit that outputs an output voltage; and
a divider circuit that is electrically connected to the control circuit and the amplifier circuit and inputs a voltage obtained by dividing the output voltage as a feedback voltage to the second reference voltage generation circuit,
wherein the input signal adjustment circuit comprises a first operational amplifier having a first non-inverting input terminal electrically connected to a first resistor and a second resistor and a first inverting input terminal electrically connected to a third resistor and a fourth resistor, and
wherein the first reference voltage generation circuit comprises a second operational amplifier having a second non-inverting input terminal electrically connected to a fifth resistor and a first diode and a second inverting input terminal electrically connected to a sixth resistor, the sixth resistor is electrically connected to a second diode, and the first diode and the second diode are applied with a power source voltage, and
wherein the second reference voltage generation circuit comprises a third operational amplifier having a third non-inverting input terminal electrically connected to a seventh resistor and a third diode and a third inverting input terminal electrically connected to an eighth resistor, the eighth resistor is electrically connected to a fourth diode, and the third diode and the fourth diode are applied with the feedback voltage.

2. The power supply circuit according to claim 1, wherein the amplifier circuit is a DC-DC converter.

3. The power supply circuit according to claim 1, wherein the amplifier circuit is a Cuk converter.

4. The power supply circuit according to claim 1, wherein the amplifier circuit is a fly-back converter.

5. The power supply circuit according to claim 1, wherein the feedback voltage is a negative voltage.

6. A power supply circuit comprising:
a control circuit comprising:
   a detection circuit including a first reference voltage generation circuit, a second reference voltage generation circuit, and an input signal adjustment circuit;
   an error amplifier circuit;
   a pulse width modulation driver;
   a triangle-wave generation circuit; and
   a capacitor,
an amplifier circuit electrically connected to the control circuit that outputs an output voltage; and
a divider circuit that is electrically connected to the control circuit and the amplifier circuit and inputs a voltage obtained by dividing the output voltage as a feedback voltage to the second reference voltage generation circuit,
wherein the input signal adjustment circuit comprises a first operational amplifier having a first non-inverting input terminal electrically connected to a first resistor and a second resistor and a first inverting input terminal electrically connected to a third resistor and a fourth resistor, and each of the first resistor and the third resistor has a first resistance value and each of the second resistor and the fourth resistor has a second resistance value, and
wherein the first reference voltage generation circuit comprises a second operational amplifier having a second non-inverting input terminal electrically connected to a fifth resistor and a first diode and a second inverting input terminal electrically connected to a sixth resistor, the sixth resistor is electrically connected to a second diode, and the first diode and the second diode are applied with a power source voltage, and
wherein the second reference voltage generation circuit comprises a third operational amplifier having a third non-inverting input terminal electrically connected to a seventh resistor and a third diode and a third inverting input terminal electrically connected to an eighth resistor, the eighth resistor is electrically connected to a fourth diode, and the third diode and the fourth diode are applied with the feedback voltage.

7. The power supply circuit according to claim 6, wherein the amplifier circuit is a DC-DC converter.

8. The power supply circuit according to claim 6, wherein the amplifier circuit is a Cuk converter.

9. The power supply circuit according to claim 6, wherein the amplifier circuit is a fly-back converter.

10. The power supply circuit according to claim 6, wherein the feedback voltage is a negative voltage.

11. A power supply circuit comprising:
a control circuit comprising:
a detection circuit including a first reference voltage generation circuit, a second reference voltage generation circuit, and an input signal adjustment circuit;
an error amplifier circuit;
a pulse width modulation driver;
a triangle-wave generation circuit; and
a capacitor,
an amplifier circuit electrically connected to the control circuit that outputs a first output voltage;
a divider circuit that is electrically connected to the control circuit and the amplifier circuit and inputs a voltage obtained by dividing the first output voltage as a feedback voltage to the second reference voltage generation circuit; and
a voltage follower provided between the divider circuit and the second reference voltage generation circuit,
wherein the input signal adjustment circuit comprises a first operational amplifier having a first non-inverting input terminal electrically connected to a first resistor and a second resistor and a first inverting input terminal electrically connected to a third resistor and a fourth resistor, and
wherein the first reference voltage generation circuit comprises a second operational amplifier having a second non-inverting input terminal electrically connected to a fifth resistor and a first diode and a second inverting input terminal electrically connected to a sixth resistor, the sixth resistor is electrically connected to a second diode, and the first diode and the second diode are applied with a power source voltage, and
wherein the second reference voltage generation circuit comprises a third operational amplifier having a third non-inverting input terminal electrically connected to a seventh resistor and a third diode and a third inverting input terminal electrically connected to an eighth resistor, the eighth resistor is electrically connected to a fourth diode, and the third diode and the fourth diode are applied with a second output voltage of the voltage follower.

12. The power supply circuit according to claim 11, wherein the amplifier circuit is a DC-DC converter.

13. The power supply circuit according to claim 11, wherein the amplifier circuit is a Cuk converter.

14. The power supply circuit according to claim 11, wherein the amplifier circuit is a fly-back converter.

15. The power supply circuit according to claim 11, wherein the feedback voltage is a negative voltage.

16. A power supply circuit comprising:
a control circuit comprising:
a detection circuit including a first reference voltage generation circuit, a second reference voltage generation circuit, and an input signal adjustment circuit;
an error amplifier circuit;
a pulse width modulation driver;
a triangle-wave generation circuit; and
a capacitor,
an amplifier circuit electrically connected to the control circuit that outputs a first output voltage;
a divider circuit that is electrically connected to the control circuit and the amplifier circuit and inputs a voltage obtained by dividing the first output voltage as a feedback voltage to the second reference voltage generation circuit; and
a voltage follower provided between the divider circuit and the second reference voltage generation circuit,
wherein the input signal adjustment circuit comprises a first operational amplifier having a first non-inverting input terminal electrically connected to a first resistor and a second resistor and a first inverting input terminal electrically connected to a third resistor and a fourth resistor, and each of the first resistor and the third resistor has a first resistance value and each of the second resistor and the fourth resistor has a second resistance value, and
wherein the first reference voltage generation circuit comprises a second operational amplifier having a second non-inverting input terminal electrically connected to a fifth resistor and a first diode and a second inverting input terminal electrically connected to a sixth resistor, the sixth resistor is electrically connected to a second diode, and the first diode and the second diode are applied with a power source voltage, and
wherein the second reference voltage generation circuit comprises a third operational amplifier having a third non-inverting input terminal electrically connected to a seventh resistor and a third diode and a third inverting input terminal electrically connected to an eighth resistor, the eighth resistor is electrically connected to a fourth diode, and the third diode and the fourth diode are applied with a second output voltage of the voltage follower.

17. The power supply circuit according to claim 16, wherein the amplifier circuit is a DC-DC converter.

18. The power supply circuit according to claim 16, wherein the amplifier circuit is a Cuk converter.

19. The power supply circuit according to claim 16, wherein the amplifier circuit is a fly-back converter.

20. The power supply circuit according to claim 16, wherein the feedback voltage is a negative voltage.

* * * * *